(12) United States Patent
Counterman

(10) Patent No.: US 8,978,100 B2
(45) Date of Patent: Mar. 10, 2015

(54) POLICY-BASED AUTHENTICATION

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 434 days.

(21) Appl. No.: 13/046,950

(22) Filed: Mar. 14, 2011

(65) Prior Publication Data
US 2012/0240211 A1 Sep. 20, 2012

(51) Int. Cl.
*H04L 29/06* (2006.01)

(52) U.S. Cl.
CPC ................................. *H04L 63/0853* (2013.01)
USPC ................................................. 726/3; 726/27

(58) Field of Classification Search
None
See application file for complete search history.

(56) References Cited

U.S. PATENT DOCUMENTS

| | | | | |
|---|---|---|---|---|
| 7,885,640 | B2 * | 2/2011 | Holtmanns et al. | 455/411 |
| 8,484,467 | B2 * | 7/2013 | Chan et al. | 713/168 |
| 8,527,762 | B2 * | 9/2013 | Cui et al. | 713/168 |
| 8,621,203 | B2 * | 12/2013 | Ekberg et al. | 713/156 |
| 8,689,303 | B1 * | 4/2014 | Abidogun et al. | 726/7 |
| 2002/0068554 | A1 * | 6/2002 | Dusse | 455/419 |
| 2004/0177156 | A1 * | 9/2004 | Hahn et al. | 709/240 |
| 2005/0138362 | A1 * | 6/2005 | Kelly et al. | 713/156 |
| 2005/0287990 | A1 * | 12/2005 | Mononen et al. | 455/411 |
| 2007/0039049 | A1 * | 2/2007 | Kupferman et al. | 726/22 |
| 2009/0259849 | A1 * | 10/2009 | Faynberg et al. | 713/169 |
| 2010/0115598 | A1 * | 5/2010 | Barriga et al. | 726/8 |
| 2010/0144314 | A1 * | 6/2010 | Sherkin et al. | 455/411 |
| 2010/0262703 | A1 * | 10/2010 | Faynberg et al. | 709/229 |
| 2011/0265153 | A1 * | 10/2011 | Guccione et al. | 726/5 |

OTHER PUBLICATIONS

"Authentication Context for the OASIS Security Assertion Markup Language (SAML) V2.0," OASIS Standard, Mar. 15, 2005, 70 pages.

* cited by examiner

*Primary Examiner* — Benjamin Lanier

(57) ABSTRACT

A device receives a request to authenticate an end user of a user device based on a requested use of an application by the user device, and communicates with an authentication client, provided in the user device, to perform an authentication requested by the request. The device also generates a response to the request based on the communication with the authentication client, where the response indicates that the end user is or is not authenticated to use the application. The device further provides the response to an application server device hosting the application.

19 Claims, 16 Drawing Sheets

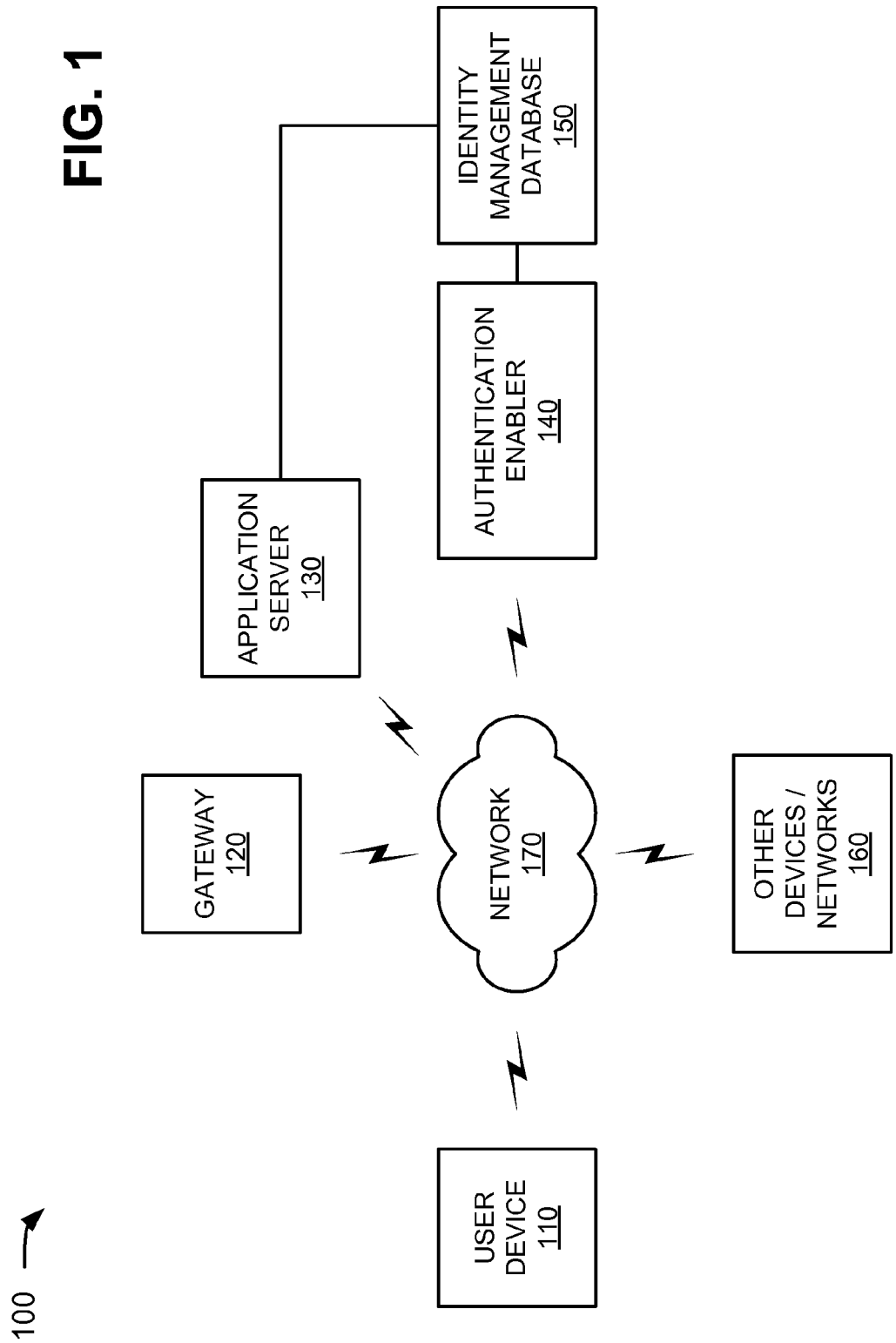

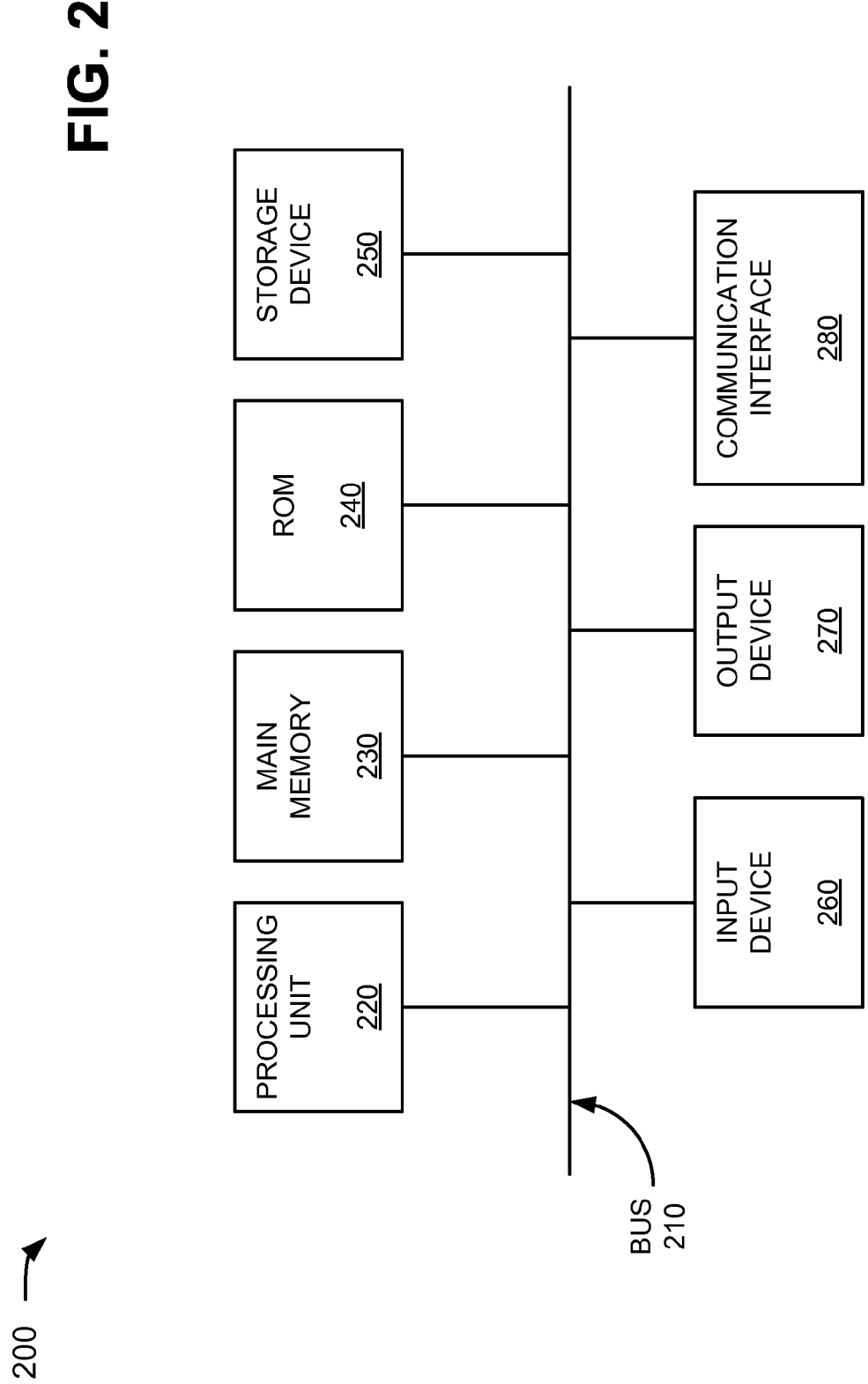

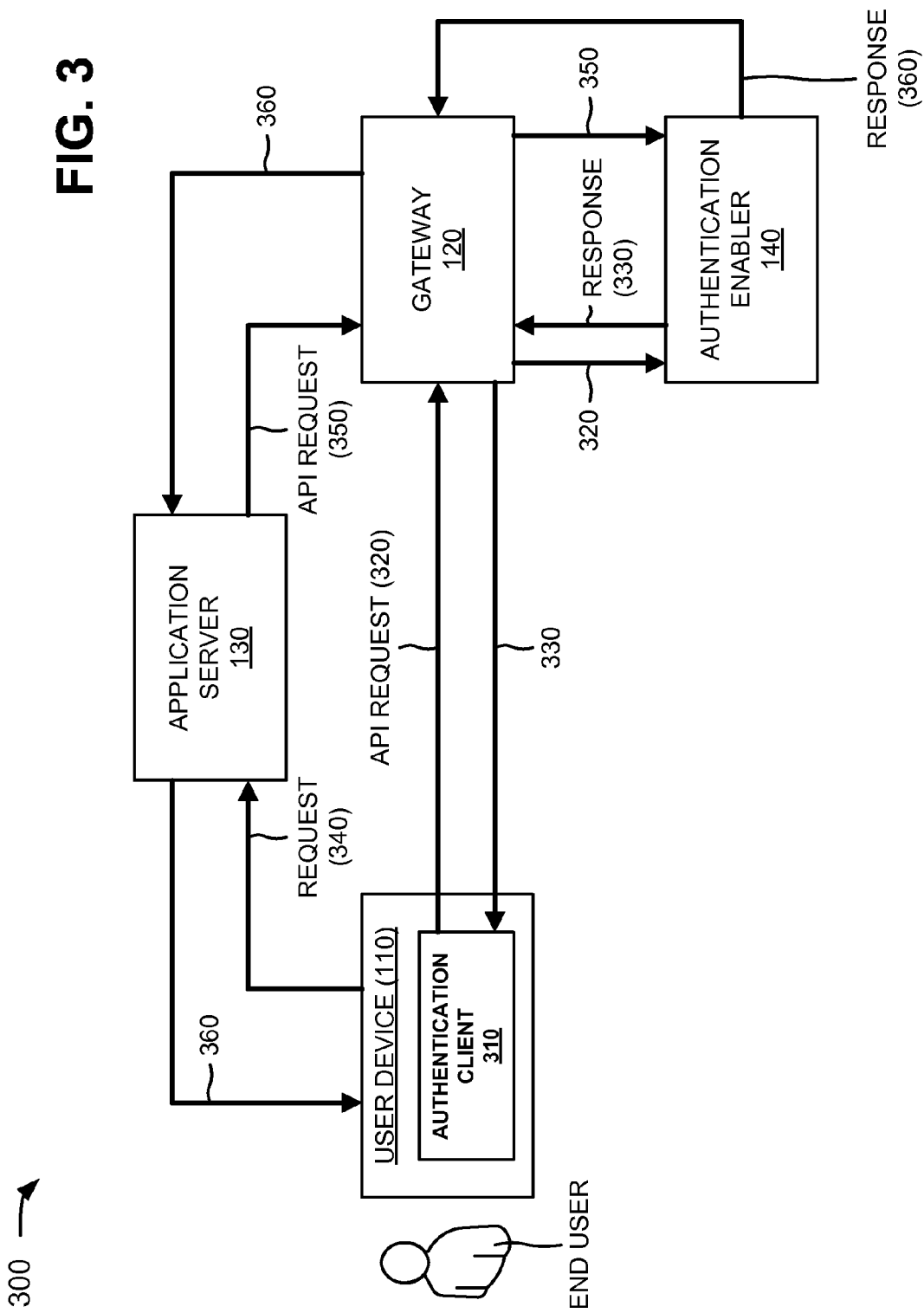

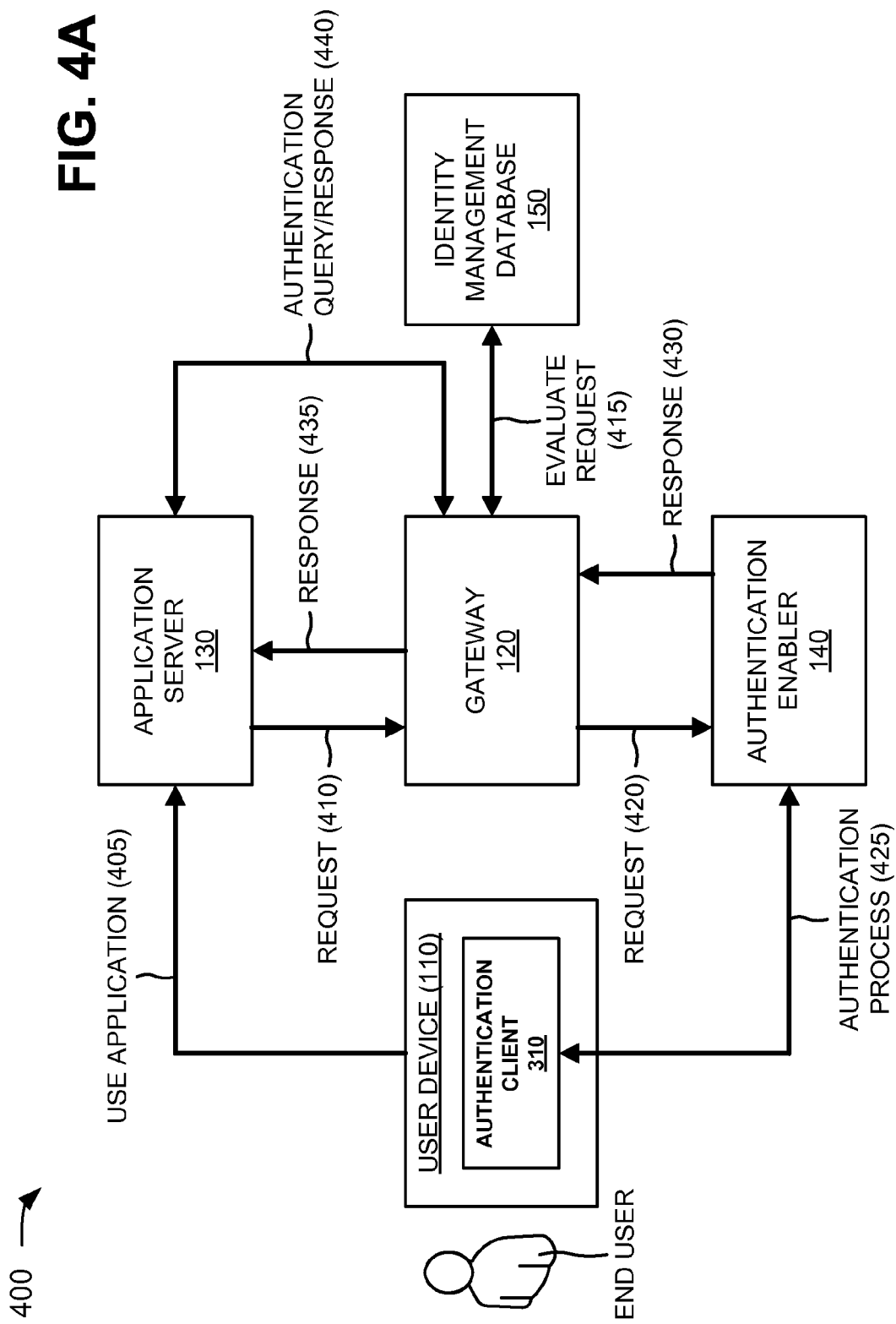

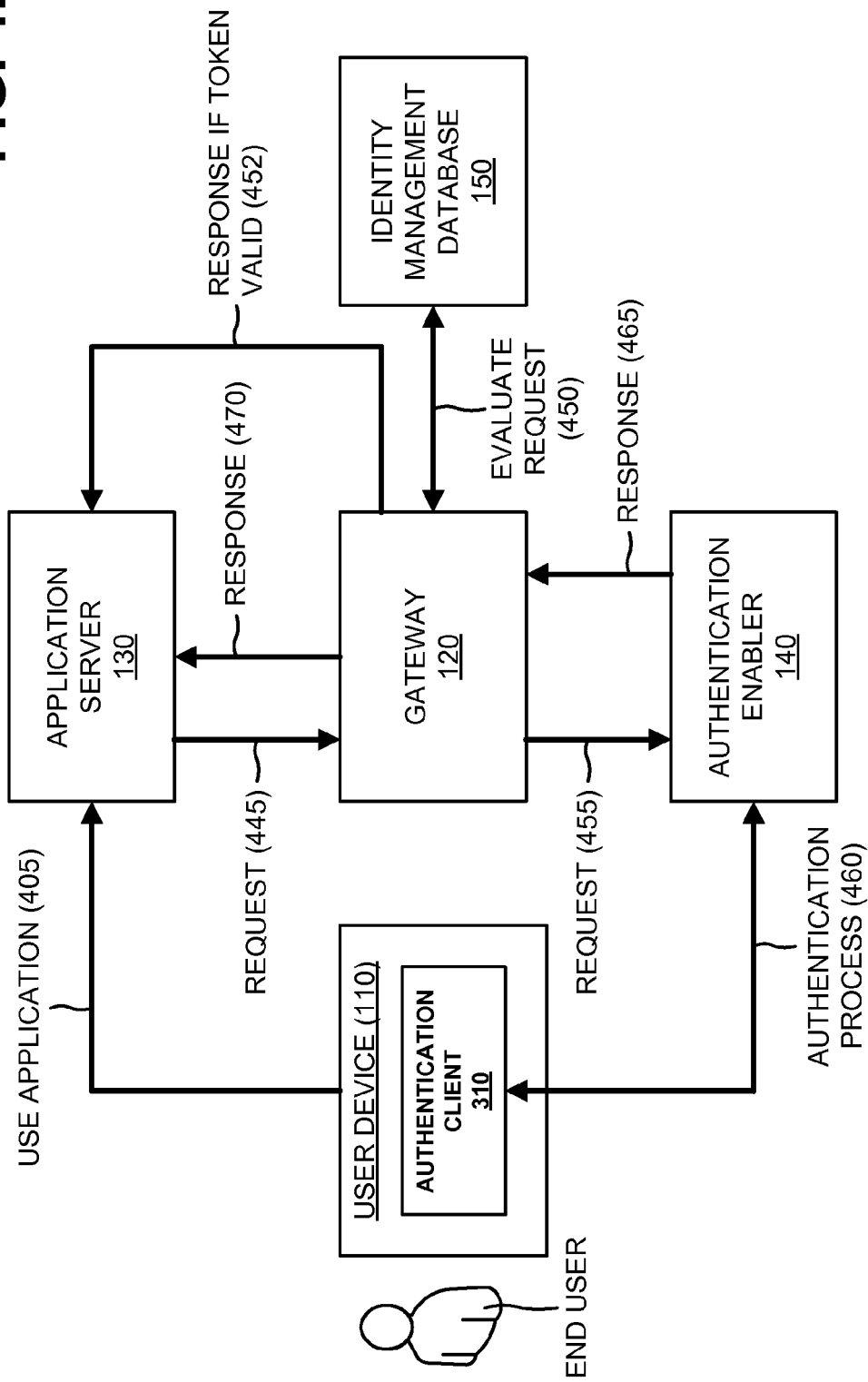

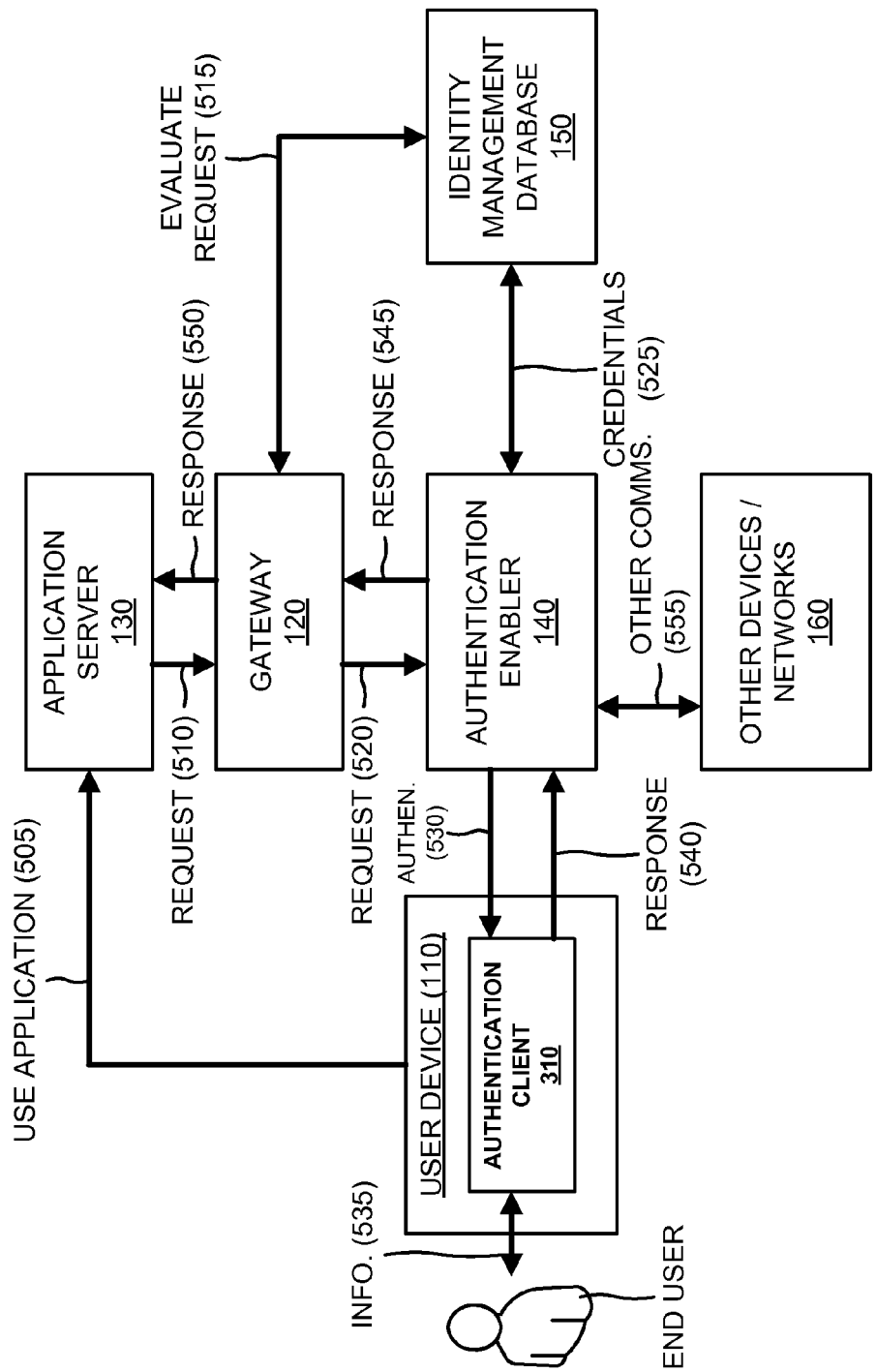

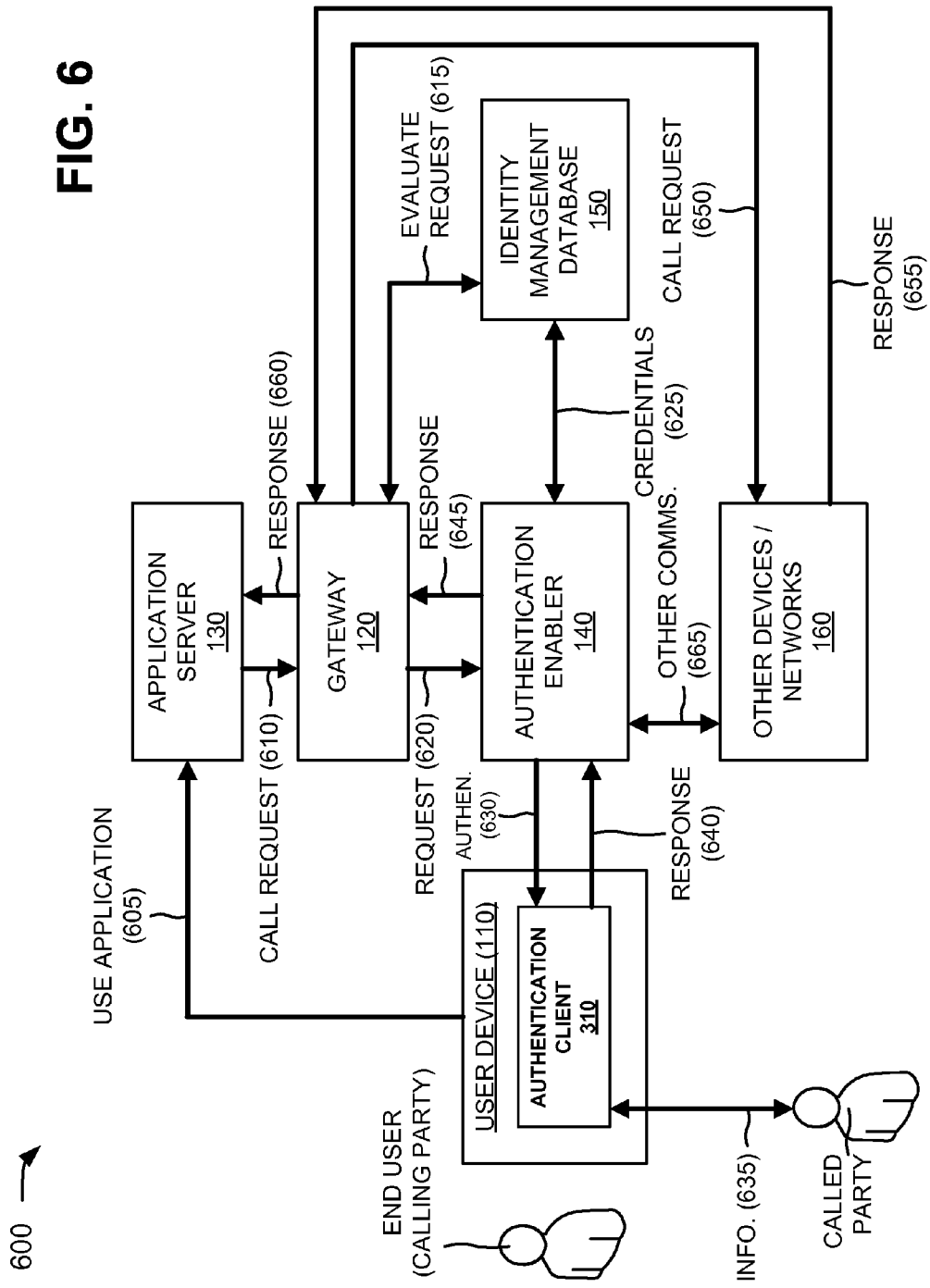

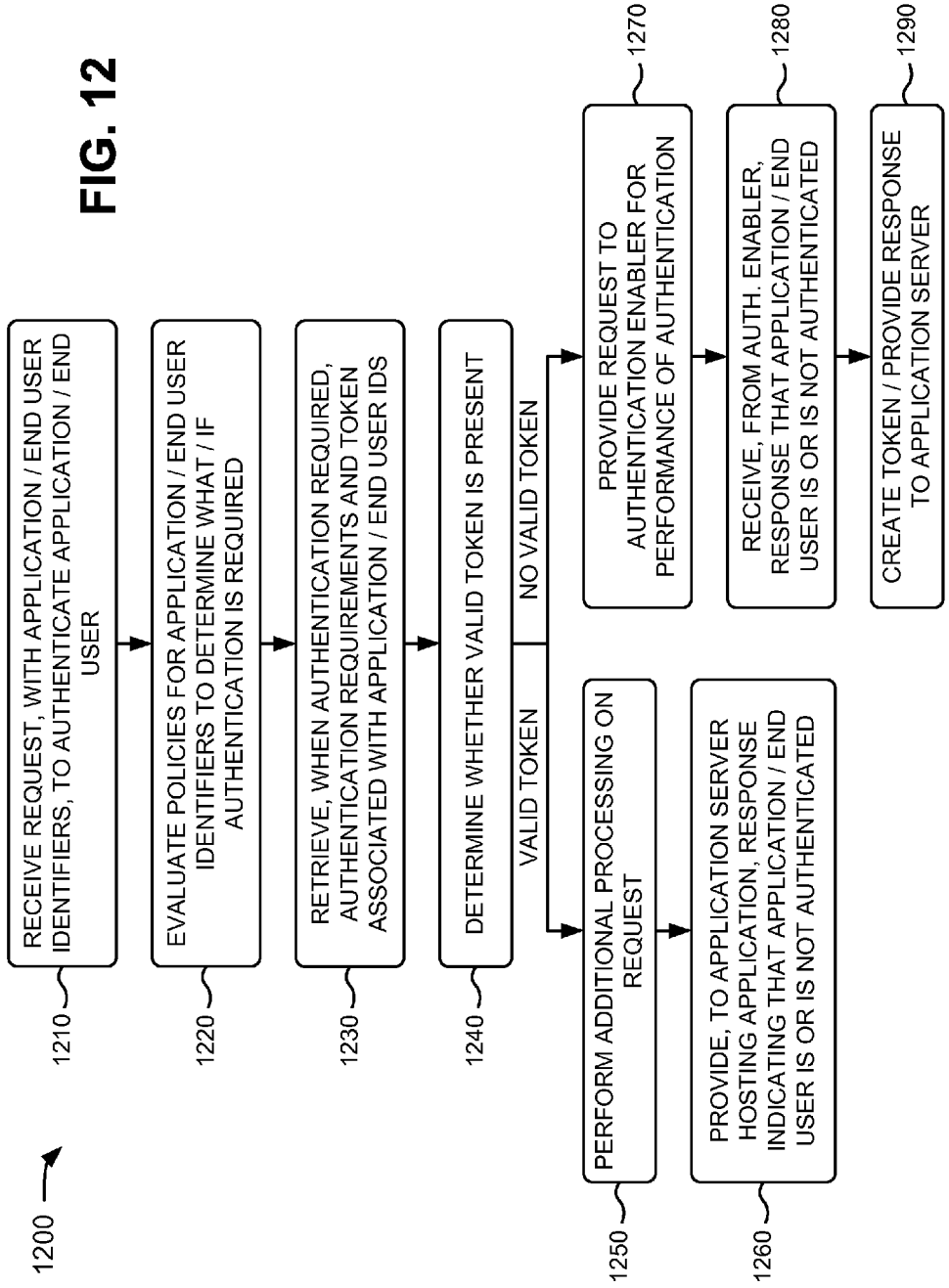

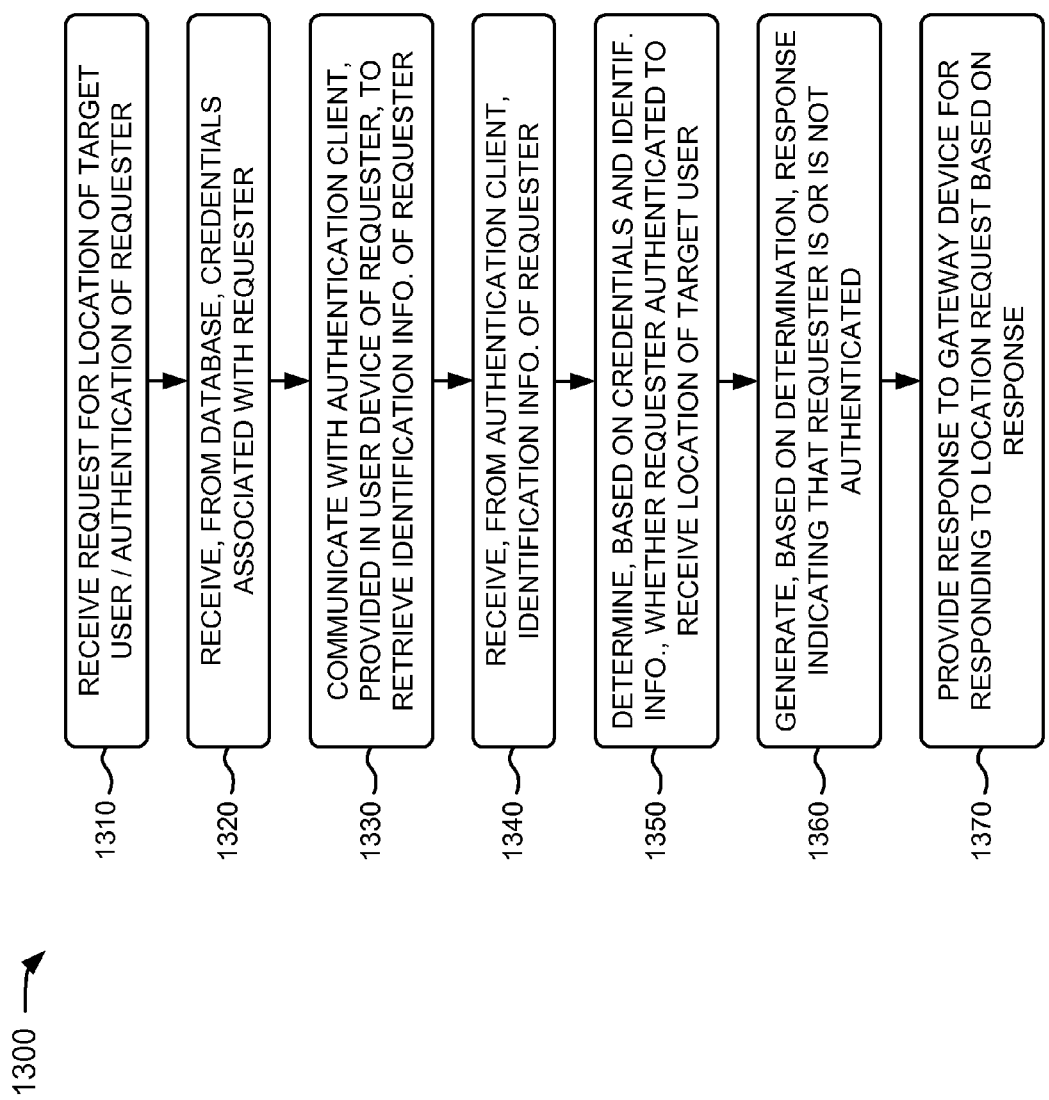

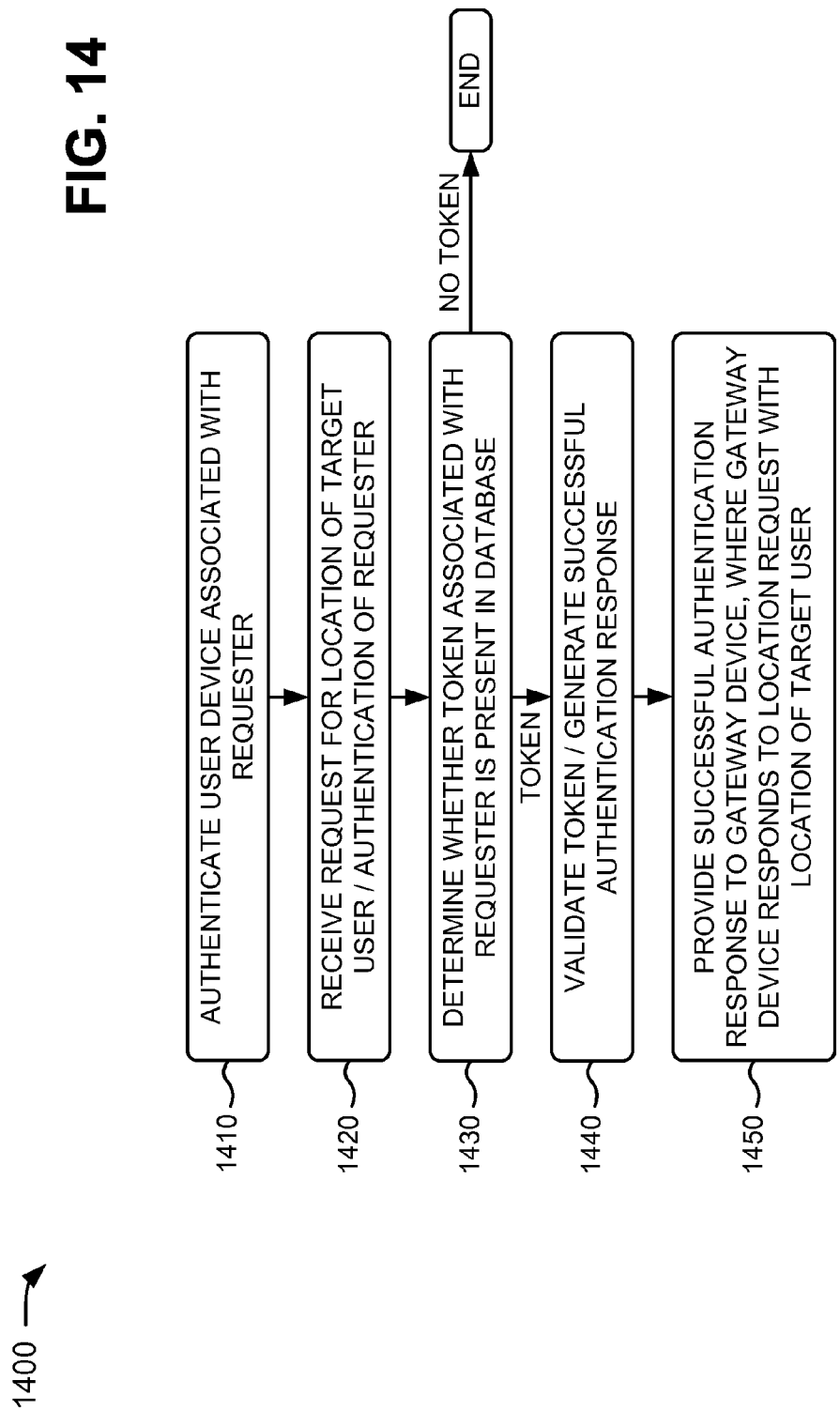

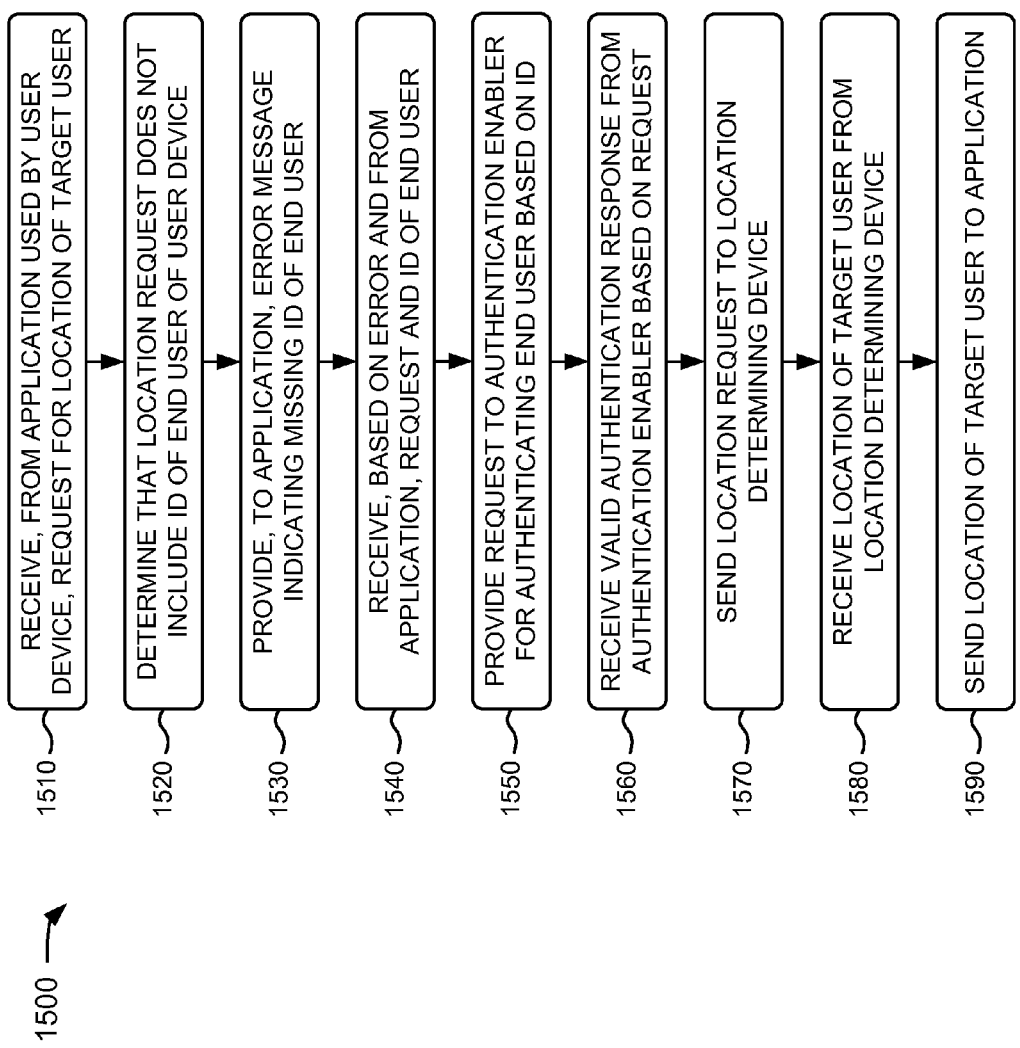

POLICY-BASED AUTHENTICATION

BACKGROUND

A service provider is an entity (e.g., a business or an organization) that sells bandwidth of or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. Service provider networks enable third party application developers to create applications that use network resources, such as location systems that determine locations of mobile communication devices. These applications make requests to a network device, such as a gateway. The network device processes the requests and sends the requests to service provider systems that provide services, such as determining the locations of mobile communication devices, messaging, and/or other services. Such service provider systems may be referred to as enablers.

The service provider network defines application programming interfaces (APIs) for third party application developers to access the capabilities of enablers in the service provider network. A third party application often needs to authenticate a person (i.e., an end user) using the third party application, and often provides some form of authentication of the end user. However, in many cases, it is preferable to have the service provider network perform this function on behalf of the third party application. For example, if a developer would like the service provider to bill for an end user's use of their application, the service provider network needs to authenticate the end user of the application. The third party application not only needs to identify the end user, but also needs to receive a level of assurance for that identification. The end user, the application, and the service provider network need to form trust relationships. Unfortunately, the APIs provided for the third party applications often do not provide an identifier for end users using the third party applications, making authentication of such end users very difficult.

BRIEF DESCRIPTION OF THE DRAWINGS

FIG. 1 is a diagram of an example network in which systems and/or methods described herein may be implemented;

FIG. 2 is a diagram of example components of one or more devices of the network illustrated in FIG. 1;

FIG. 3 is a diagram of example operations capable of being performed by an example portion of the network illustrated in FIG. 1;

FIGS. 4A and 4B are diagrams of example operations capable of being performed by another example portion of the network illustrated in FIG. 1;

FIG. 5 is a diagram of example authentication request operations capable of being performed by an example portion of the network illustrated in FIG. 1;

FIG. 6 is a diagram of example policy-based authentication operations capable of being performed by an example portion of the network illustrated in FIG. 1;

FIG. 12 is a flow chart of an example process for performing policy-based authentication according to implementations described herein;

FIG. 13 is a flow chart of an example process for authenticating a user device or an end user, when an authentication request is missing an end user identifier, according to implementations described herein;

FIG. 14 is a flow chart of an example process for locating a target user according to implementations described herein; and FIG. 15 is a flow chart of another example process for locating a target user according to implementations described herein.

DETAILED DESCRIPTION OF PREFERRED EMBODIMENTS

Figure 7:
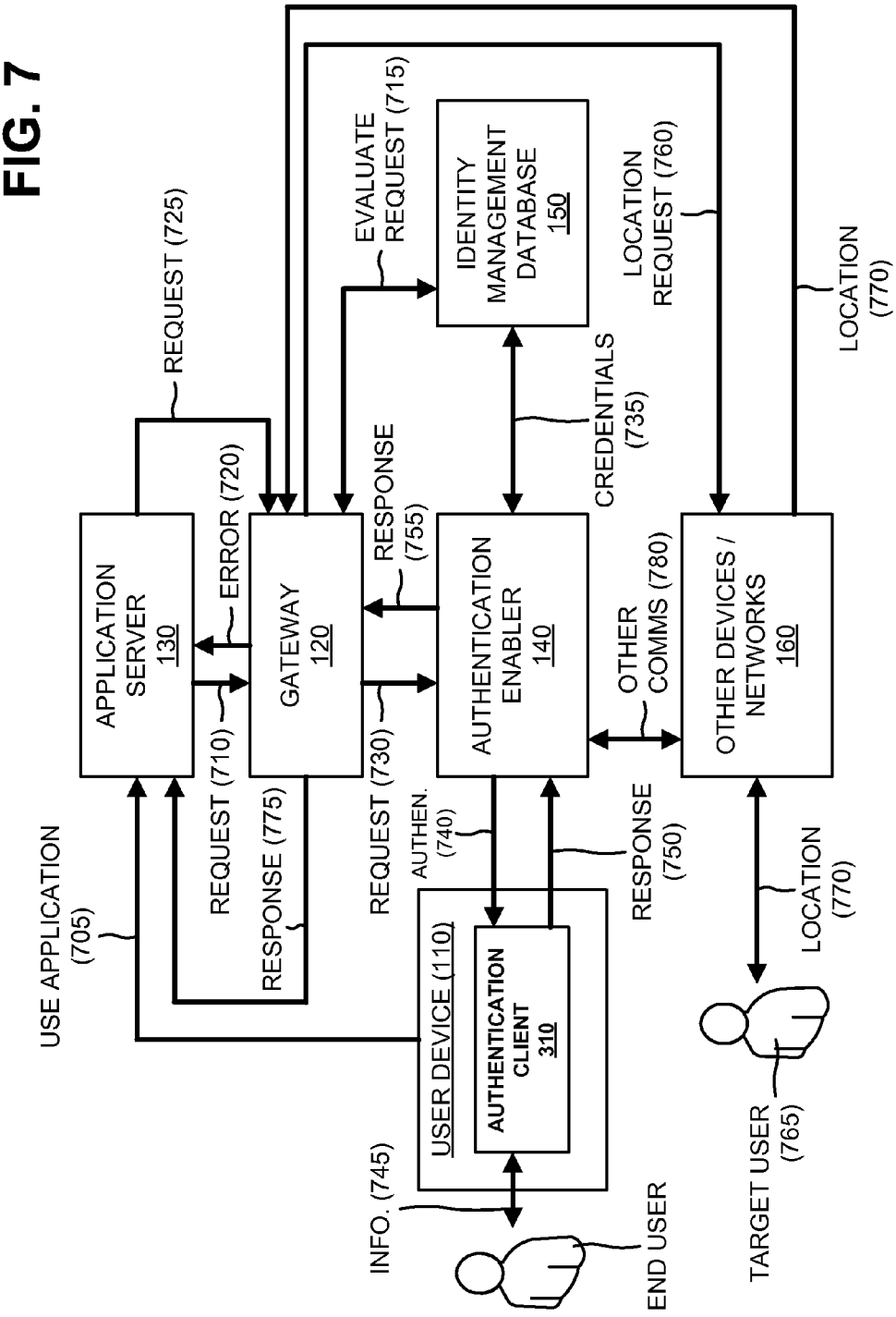
FIG. 7 is a diagram of example authentication request operations, where the authentication request is missing an end user identifier, capable of being performed by an example portion of the network illustrated in FIG. 1.

The following detailed description refers to the accompanying drawings. The same reference numbers in different drawings may identify the same or similar elements.

Systems and/or methods described herein may provide an authentication enabler and a gateway in a service provider network, and may provide an authentication client in a user device. The authentication enabler, gateway, and authentication client may enable the systems and/or methods to perform authentication processes. For example, the systems and/or methods may perform an authentication as a result of an authentication request received from a third party application. In another example, the systems and/or methods may perform a policy-based authentication in which the gateway performs a role in evaluating authentication policies.

In one example implementation, a third party application, associated with a service provider network, may request authentication of an identity, such as an end user identity. The systems and/or methods may authenticate the third party application and may evaluate authentication policies for the application, the end user, and the service provider network. If the request complies with policies, the authentication enabler and the authentication client may perform authentication processes requested by the request, and may return an authentication result to the requesting third party application.

If identity information, associated with the end user, is not provided in the request and a policy requires authentication of the end user identity, the systems and/or methods may return a message to the third party application. The returned message may instruct the application to obtain the identity information of the end user, and return the identity information to the gateway. Upon receipt of the identity information, the gateway may request the authentication enabler to authenticate the end user identity, with a method defined by policies, and to return the authentication result. If the authentication result indicates that the end user identity is authenticated, the third party application may request that another enabler (e.g., a location enabler), associated with the service provider network, perform a particular function, such as determine a location of a target user device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the term "user" is intended to be broadly interpreted to include a user device or a user of a user device.

FIG. 1 is a diagram of an example network 100 in which systems and/or methods described herein may be implemented. As illustrated, network 100 may include a user device 110, a gateway 120, an application server 130, an authentication enabler 140, an identity management database 150, and other devices and/or networks 160 interconnected by a network 170. Components of network 100 may interconnect via wired and/or wireless connections or links. A single user device 110, gateway 120, application server 130, authentication enabler 140, identity management database 150, other devices/networks 160, and network 170 have been illustrated in FIG. 1 for simplicity. In practice, there may be more user devices 110, gateways 120, application servers 130, authentication enablers 140, identity management databases 150, other devices/networks 160, and/or networks 170. Also, in some instances, one or more of the components of network 100 may perform one or more functions described as being performed by another one or more of the components of network 100.

User device 110 may include any device that is capable of communicating with gateway 120, application server 130, authentication enabler 140, and/or other devices/networks 160 via network 170. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), a set-top box (STB), a voice over Internet protocol (VoIP) device, an analog terminal adaptor (ATA), etc. In another example, user device 110 may include a fixed (e.g., provided in a particular location, such as within a user's home) computation and/or communication device, such as a laptop computer, a personal computer, a tablet computer, a STB, a television, a gaming system, etc.

In one example implementation, user device 110 may include an authentication client that interfaces with an end user of user device 110, and communicates with gateway 120 and/or authentication enabler 140 to perform authentications of the end user. The authentication client may reside in a storage device provided in user device 110 or may reside in an external storage device, such as a Subscriber Identity Module (SIM) card, an external hard drive, a flash memory data storage device, etc. The authentication client, via user device 110, may enable the end user to access one or more third party applications provided in application server 130 and described below.

Gateway 120 may include one or more computation and/or communication devices that gather, process, search, and/or provide information in a manner described herein. For example, gateway 120 may include one or more server devices, network devices (e.g., routers, switches, firewalls, network interface cards (NICs), hubs, bridges, optical add-drop multiplexers (OADMs), etc.), etc. In an example implementation, gateway 120 may receive requests from third party applications provided by application server 130, and may perform policy actions on the requests. Gateway 120 may forward the requests for further processing (if necessary), and may route the requests to authentication enabler 140. The authentication enabler 140 may return responses (for the requests) to the gateway 120, and gateway 120 may provide the responses to the requesting third party applications. Gateway 120 may be a functional entity that may include one or more processing elements and may provide policy decisions and enforcement.

Policies, which may be invoked by gateway 120, may include authentication rules, business rules, authorization, etc. Authentication rules may include user names, passwords, personal identification numbers (PINs), etc. Business rules may include operations, definitions, and/or constraints that apply to an organization, and may apply to people, processes, corporate behavior and computing systems in an organization.

Application server 130 may include one or more server devices, or other types of computation or communication devices, that gather, process, search, and/or provide information in a manner described herein. In an example implementation, application server 130 may store one or more third party applications that use resources provided by a service provider network, which may include gateway 120, authentication enabler 140, identity management database 150, and other devices/networks 160. The third party applications may include applications that determine locations of mobile communication devices (e.g., user device 110), applications that connect calls between user device 110 and other user devices 110, etc. The third party applications, via application server 130, may provide services to end users associated with user device 110, may make authentication requests to authentication enabler 140, and may make requests for other services to other enablers associated with the service provider network. The third party applications, via application server 130, may receive responses to such requests from gateway 120. Alternatively, or additionally, one or more of the third party applications may be permanently stored on user device 110 or may be retrieved from application server 130 and temporarily stored on user device 110.

Authentication enabler 140 may include one or more server devices, or other types of computation or communication devices, that gather, process, search, and/or provide information in a manner described herein. In an example implementation, authentication enabler 140 may receive a request for authenticating user device 110, an end user of user device 110, and/or a third party application being utilized by user device 110, and may perform the authentication requested by the request. If the authentication is successful, authentication enabler 140 may create a mechanism, such as a security token, an authentication token, or an access token, indicating a successful authentication. The security, authentication, or access token may include an expiration time period. Authentication enabler 140 may store session information associated with the authentication, and may generate a response indicating whether the authentication is successful (e.g., which may include the security, authentication, or access token) or is unsuccessful. In one example, authentication enabler 140 may utilize other devices/networks 160 for performing authentications, such as using an instant messaging system to authenticate the end user or using a voice communication system to authenticate a voice of the end user.

Identity management database 150 may include one or more storage devices that store information provided by and/or retrieved by gateway 120 and/or authentication enabler 140. In one example implementation, identity management database 150 may store identity management information, such as user identities, user credentials, tokens, user profiles, authentication policies, etc.

Other devices/networks 160 may include one or more computation or communication devices, or networks, that gather, process, search, and/or provide information in a manner described herein. In one example implementation, other devices/networks 160 may include other enabler devices (e.g., an instant messaging system, a voice processing system, a location enabler, etc.); a registration server; a bootstrapping server function (BSF) device; a home subscriber server (HSS); etc.

Network 170 may include a local area network (LAN), a wide area network (WAN), a metropolitan area network (MAN), a telephone network, such as the Public Switched Telephone Network (PSTN), an intranet, the Internet, an optical fiber or fiber optic-based network, or a combination of networks. In one example implementation, network 170 may enable user device 110 to communicate with one or more of gateway 120, application server 130, authentication enabler 140, identity management database 150, and other devices/networks 160.

In one example implementation of network 100, authentication enabler 140 may provide third party applications, generated via application server 130 and used by user device 110, with the ability to request authentication of an identity, such as an end user of user device 110. Authentication enabler 140 may also enable the third party applications to request a type of authentication of the end user, such as via a user name and password, via a secure token, etc. The third party applications, the end user, and the service provider network may implement policies that govern the authentication process performed by authentication enabler 140. For example, the end user may deny a third party application access to a location of the end user. In another example, a third party application may require a two-factor authentication of the end user (e.g., something a user has and something a user knows), and may not explicitly request authentication when requesting other enablers, such as an instant messaging system, provided by other devices/networks 160. Such an authentication process may be referred to as a policy-based authentication and may involve gateway 120. In one example implementation, the authentication process may be a combination of requested behavior and policy evaluations.

In another example implementation of network 100, the authentication client, associated with user device 110, may receive challenges and may process information, such as username and password, received from the end user, user device 110, gateway 120, application server 130, and/or other devices/networks 160. Authentication enabler 140 may receive requests to authenticate the end user, user device 110, and/or third party application utilized by user device 110. End user credentials, and information for authentication and identity management may be securely delivered to the authentication client, authentication enabler 140, and/or identity management database 150. Some end user credentials and/or identity information may be stored in other devices/networks 160, such as in a HSS.

Although FIG. 1 shows example components of network 100, in other implementations, network 100 may contain fewer components, different components, differently arranged components, or additional components than depicted in FIG. 1.

FIG. 2 is a diagram of example components of a device 200 that may correspond to one or more devices of network 100, such as user device 110, gateway 120, application server 130, and/or authentication enabler 140. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example operations capable of being performed by an example portion 300 of network 100. As shown in FIG. 3, network portion 300 may include user device 110, gateway 120, application server 130, and authentication enabler 140. User device 110, gateway 120, application server 130, and authentication enabler 140 may include the features described above in connection with one or more of, for example, FIGS. 1 and 2.

As further shown in FIG. 3, user device 110 may include an authentication client 310. Authentication client 310 may interface with an end user of user device 110, and may communicate with authentication enabler 140 to perform authentications of the end user. Authentication client 310 may reside in a storage device (e.g., storage device 250) provided in user device 110 or may reside in an external storage device, such as a SIM card, an external hard drive, a flash memory data storage device, etc. Authentication client 310, via user device 110, may enable the end user to access one or more third party applications provided in application server 130.

User device 110, via authentication client 310, may generate a request using an API provided by user device 110, as indicated by reference number 320. API request 320 may include a request for services provided by an enabler, such as a request to authenticate the end user and/or user device 110. User device 110 may provide API request 320 to gateway 120, and gateway 120 may receive API request 320 and may evaluate API request 320 to determine what function is being requested by API request 320. For example, gateway 120 may determine that API request 320 is requesting authentication services provided by authentication enabler 140. Based on this determination, gateway 120 may forward API request 320 to authentication enabler 140. Authentication enabler 140 may receive API request 320, may perform the requested authentication, and may provide a response 330 to gateway 120. Response 330 may indicate that the end user and/or user device 110 are authenticated for services provided by application server 130 and/or the service provider network, which may include gateway 120, authentication enabler 140, identity management database 150, and other devices/networks 160. Gateway 120 may receive response 330, and may forward response 330 to authentication client 310 of user device 110. If response 330 indicates that the end user and/or user device 110 are authenticated, the end user and/or user device 110 may utilize services provided by application server 130 and/or the service provider network.

As further shown in FIG. 3, user device 110, via authentication client 310, may generate a request 340 for use of an application provided by application server 130. Application server 130 may receive request 340, and may generate, based on request 340, a request using an API provided by application server 130, as indicated by reference number 350. API request 350 may include a request for services provided by an enabler, such as a request to authenticate the end user, user device 110, and/or the application. Application server 130 may provide API request 350 to gateway 120, and gateway 120 may receive API request 350 and may evaluate API request 350 to determine what function is being requested by API request 350. For example, gateway 120 may determine that API request 350 is requesting authentication services provided by authentication enabler 140. Based on this determination, gateway 120 may forward API request 350 to authentication enabler 140. Authentication enabler 140 may receive API request 350, may perform the requested authentication, and may provide a response 360 to gateway 120. Response 360 may indicate that the end user, user device 110, and/or the application are authenticated for the application and/or for services provided by the service provider network. Gateway 120 may receive response 360, and may forward response 360 to application server 130. Application server 130 may forward response 360 to user device 110. If response 360 indicates that the end user, user device 110, and/or the application are authenticated, the end user and/or user device 110 may utilize the application and/or services provided by the service provider network.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

FIGS. 4A and 4B are diagrams of example operations capable of being performed by another example portion 400 of network 100. As shown in FIGS. 4A and 4B, network portion 400 may include user device 110, gateway 120, application server 130, authentication enabler 140, identity management database 150, and authentication client 310. User device 110, gateway 120, application server 130, authentication enabler 140, identity management database 150, and authentication client 310 may include the features described above in connection with one or more of, for example, FIGS. 1-3.

In one example implementation, FIG. 4A may depict operations associated with an authentication process based on an authentication request received from an application provided in application server 130. FIG. 4B may depict operations associated with a policy-based authentication process in which gateway 120 may evaluate authentication policies. The authentication processes depicted in FIGS. 4A and 4B may include a combination of requested behavior and policy evaluations.

As further shown in FIG. 4A, an end user, via user device 110, may invoke the use of an application provided by application server 130, as indicated by reference number 405. Based on requested use 405 of the application, application server 130 may generate a request 410 to use authentication services provided by authentication enabler 140. Request 410 may include, for example, a request to authenticate the end user of user device 110 using a generic bootstrapping architecture (GBA), which is technology enabling authentication of a user of a mobile communication device. In another example, request 410 may include a request to authenticate the end user with a user name and password that may not be known to the application but may be credentials in an account or identity profile associated with the end user. In still another example, request 410 may include a request to authenticate an end user via other authentication mechanisms, such as a password, a one-time password, a public key cryptography (SSL), biometrics, etc. Request 410 may include an application identifier and an identifier for the end user, such as a mobile directory number (MDN) for user device 110 or other identifiers (e.g., an email address, a name of the end user, etc.). Request 410 may include other parameters, such as a type of authentication, a level of authentication assurance (e.g., based on National Institute of Standards and Technology (NIST) assurance levels), and optional parameters. An example request 410 may include the following parameters: application identifier (AppID=X); application password (AppPwd=Y); authentication method=password; identifier=MDN; and MDN=16175550101.

Application server 130 may provide request 410 to gateway 120, and gateway 120 may receive request 410. Gateway 120 may evaluate request 410 by retrieving information provided in identity management database 150, as indicated by reference number 415. For example, gateway 120 may evaluate 415 policies for the application, associated with request 410, to determine what and if authentication is required by request 410. Gateway 120 may also evaluate 415 policies for the end user identifier (e.g., the MDN), provided in request 410, to determine what and if authentication is required. Based on the evaluation of request 410, gateway 120 may provide a request 420 to authentication enabler 140. Request 420 may include the features of request 410, but may also include information obtained from the evaluation of request 410, such as an authentication required by request 410.

Authentication enabler 140 may receive request 420, and may communicate with authentication client 310, and possibly other devices/networks 160 (not shown), to perform the authentication process requested by request 420, as indicated by reference number 425. Based on performance of authentication process 425, authentication enabler 140 may generate a response 430. Response 430 may include an expiration value, and details of authentication process 425, such as whether or not the end user is authenticated. An example response 430 may include the following parameters: AppID=X; authentication=true; authentication method=password; identifier=MDN; MDN=16175550101; assurance=L1; and expiration 2011-11-16T23:59:58.75.

Authentication enabler 140 may provide response 430 to gateway 120, and gateway 120 may perform additional processing on response 430 (if necessary) to generate a response 435. Response 435 may include the features of response 430, but may also include information obtained from the additional processing of response 430. Gateway 120 may provide response 435 to application server 130, and application server 130 may determine whether the end user is authenticated for the application based on response 435. For example, if response 435 indicates that the end user is authenticated, application server 130 may permit the end user, via user device 110, to use the application. If response 435 indicates that the end user is not authenticated, application server 130 may not permit the end user to use the application.

As further shown in FIG. 4A, application server 130 may provide an authentication query 440 to gateway 120. Authentication query 440 may request an authentication state associated with an application and/or an end user identity (e.g., the MDN). Gateway 120 may receive authentication query 440, and may evaluate authentication query 440 to ensure compliance with governing policies for the application and/or the end user identity. Gateway 120 may generate an authentication response 440 that may include a state of the authentication (e.g., true or false), an expiration time, and context information that comply with policies. For example, authentication response 440 may include the following parameters: AppID=X, authentication=true; authentication method=password; identifier=MDN; MDN=16175550101; assurance=L1; and expiration 2011-11-16T23:59:58.75. Gateway 120 may provide authentication response 440 to application server 130.

In one example implementation, requests 410/420 and responses 430/435 may include an authentication context, such as the authentication context used in the Security Assertion Markup Language (SAML). The authentication context may provide detailed information on a type and strength of authentication employed. In one example, the authentication context may request multi-factor authentication, and may be included in requests 410/410. The authentication context may be based on a general Extensible Markup Language (XML) schema that defines mechanisms for creating authentication context declarations and a set of defined authentication context classes (e.g., each class with their own XML schema) that describe methods of authentication. The information provided in the authentication context may include initial user identification mechanisms (e.g., face-to-face, online, shared secret, etc.); mechanisms for minimizing compromise of credentials (e.g., credential renewal frequency, client-side key generation, etc.); mechanisms for storing and protecting credentials (e.g., smartcard, password rules, etc.); and authentication mechanisms or methods (e.g., password, certificate-based Secure Sockets Layer (SSL)).

As shown in FIG. 4B, the end user, via user device 110, may use 405 an application provided by application server 130. Based on requested use 405 of the application, application server 130 may generate a request 445 that includes an application identifier and an identifier for the end user, such as the MDN for user device 110. In one example, request 445 may include the features described above for request 410. Application server 130 may provide request 445 to gateway 120, and gateway 120 may receive request 445. Gateway 120 may evaluate request 445 by retrieving information provided in identity management database 150, as indicated by reference number 450. For example, gateway 120 may evaluate 450 policies for the application, associated with request 445, to determine what and if authentication is required by request 445. Gateway 120 may also evaluate 450 policies for the end user identifier (e.g., the MDN), provided in request 445, to determine what and if authentication is required. If authentication is required by request 445, gateway 120 may retrieve authentication requirements and a token (if present) associated with the application identifier and/or the end user identifier. Gateway 120 may then determine whether a valid token is present for the application and/or end user identifiers.

If a token is present, gateway 120 may validate the token when the token meets authentication requirements and has not expired. For example, an authentication requirement may include GBA authentication with user name and password authentication. If gateway 120 determines that the token is valid, gateway 120 may further process request 445 with additional policy evaluations and may perform additional actions requested by request 445. For example, gateway 120 may complete a call to an enabler, such as a location enabler. If the token is valid, gateway 120 may log authentication session information in a response 452. The authentication session information may include the validated token, results of the additional policy evaluations, and results of additional actions performed by gateway 120, etc. Gateway 120 may provide response 452 to application server 130, and application server 130 may determine that the end user is authenticated for the application based on response 452 and may permit the end user, via user device 110, to use the application. Authentication enabler 140 may not be involved in the operations when a valid token is present.

If the token has expired or is determined to be invalid based on the evaluation of request 445, gateway 120 may provide a request 455 to authentication enabler 140. Request 455 may include the features of request 445, but may also include information obtained from the evaluation of request 445, such as an authentication required by request 445. Authentication enabler 140 may receive request 455, and may communicate with authentication client 310, and possibly other devices/networks 160 (not shown), to perform the authentication process requested by request 455, as indicated by reference number 460. Based on performance of authentication process 460, authentication enabler 140 may generate a response 465. Response 465 may include an authentication token (if the authentication is successful) and an expiration value.

Authentication enabler 140 may provide response 465 to gateway 120, and gateway 120 may perform additional processing on response 465 (if necessary) to generate a response 470. The additional processing may include gateway 120 forwarding request 445 to other enablers requested by request 445, and receiving, from the other enablers, results of performance of functions requested by request 445. The additional processing may also include additional policy evaluations. Response 470 may include the features of response 465, but may also include information obtained from the additional processing of response 465. Gateway 120 may provide response 470 to application server 130, and application server 130 may determine whether the end user is authenticated for the application based on response 470. For example, if response 470 indicates that the end user is authenticated, application server 130 may permit the end user, via user device 110, to use the application. If response 470 indicates that the end user is not authenticated, application server 130 may not permit the end user to use the application.

Although FIGS. 4A and 4B show example components of network portion 400, in other implementations, network portion 400 may include fewer components, different components, differently arranged components, or additional components than depicted in FIGS. 4A and 4B. Alternatively, or additionally, one or more components of network portion 400 may perform one or more other tasks described as being performed by one or more other components of network portion 400.

FIG. 5 is a diagram of example authentication request operations capable of being performed by an example portion 500 of network 100. As shown in FIG. 5, network portion 500 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-4.

As further shown in FIG. 5, an end user, via user device 110, may invoke the use of an application provided by application server 130, as indicated by reference number 505. Based on requested use 505 of the application, application server 130 may generate a request 510 to use authentication services provided by authentication enabler 140. In the example depicted in FIG. 5, request 510 may include a request for password authentication of the end user of user device 110 using the MDN associated with the end user. An example request 510 may include the following parameters: AppID=X; AppPwd=Y; authentication method=password; identifier=MDN; and MDN=16175550101.

Application server 130 may provide request 510 to gateway 120, and gateway 120 may receive request 510. Gateway 120 may evaluate request 510 by retrieving information provided in identity management database 150, as indicated by reference number 515. For example, gateway 120 may evaluate 515 policies for the application, associated with request 510, to determine what and if authentication is required by request 510. Gateway 120 may also evaluate 515 policies for the end user identifier (e.g., the MDN), provided in request 510, to determine what and if authentication is required. Based on the evaluation of request 510, gateway 120 may provide a request 520 to authentication enabler 140. Request 520 may include the features of request 510, but may also include information obtained from the evaluation of request 510, such as an authentication required by request 510.

Authentication enabler 140 may receive request 520, and may retrieve credentials associated with the end user from identity management database 150, as indicated by reference number 525. Authentication enabler 140 may communicate with authentication client 310, and possibly other devices/networks 160, as indicated by reference number 555. Based on such communications, authentication enabler 140 may perform the user name/password authentication requested by request 520, as indicated by reference number 530. Authentication client 310 may request information 535 from the end user, and the end user may provide information 535 via user device 110. Information 535 may include a user name and password associated with the end user. Authentication client 310 may create a response 540, that includes information 535, and may provide response 540 to authentication enabler 140. Based on response 540, authentication enabler 140 may complete the authentication process by comparing credentials 525 and information 535, may create an authentication token (if the authentication is successful), and may generate a response 545 that includes the authentication token and an expiration value.

Authentication enabler 140 may provide response 545 to gateway 120, and gateway 120 may log the information provided in response 545 and may generate a response 550. Response 550 may include the features of response 545. An example response 550 may include the following parameters: AppID=X; authentication=true; authentication method=password; identifier=MDN; MDN=16175550101; assurance=L1; and expiration 2011-11-16T23:59:58.75. Gateway 120 may provide response 550 to application server 130, and application server 130 may determine whether the end user is authenticated for the application based on response 550. For example, if response 550 indicates that the end user is authenticated, application server 130 may permit the end user, via user device 110, to use the application. If response 550 indicates that the end user is not authenticated, application server 130 may not permit the end user to use the application.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

FIG. 6 is a diagram of example policy-based authentication operations capable of being performed by an example portion 600 of network 100. As shown in FIG. 6, network portion 600 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-5. For the policy-based authentication operations of FIG. 6, gateway 120 may make authentication requests to authentication enabler 140 based on required policy actions. Policies or rules may be stored in identity management database 150 and may be evaluated and enforced by gateway 120.

As further shown in FIG. 6, an end user, via user device 110, may invoke the use of an application provided by application server 130, as indicated by reference number 605. The application may include, for example, an application using a third party call request (e.g., Third Party Call Control (3PCC)) to establish call between an end user of user device 110 (a calling party) and another user device (a called party). Both the calling party and the called party may require authentication prior to invocation of an enabler connecting the call. Based on requested use 605 of the application, application server 130 may generate a third party call request 610. In the example depicted in FIG. 6, third party call request 610 may include the following parameters: AppID=X; AppPwd=Y; identifier=MDN; calling party=16175550101; and called party=16175551111.

Application server 130 may provide request 610 to gateway 120, and gateway 120 may receive request 610. Gateway 120 may evaluate request 610 by retrieving information provided in identity management database 150, as indicated by reference number 615. For example, gateway 120 may evaluate 615 policies for the application, associated with request 610, to determine what and if authentication is required by request 610. In the example of FIG. 6, it may be assumed that gateway 120 determines that user name and password authentication is required for each end user (e.g., the calling party and the called party) of the third party call. Gateway 120 may also evaluate 615 policies for the end user identifiers (e.g., the MDNs of the calling and called parties), provided in request 610, to determine what and if authentication is required. In the example of FIG. 6, it may be assumed that gateway 120 retrieves a token for the calling party (e.g., the end user of user device 110) and determines that the end user has a valid token and is thus authenticated. However, it may be further assumed that gateway 120 does not receive a token for the called party and thus may need to authenticate the called party. Based on the evaluation of request 610, gateway 120 may provide a request 620 to authentication enabler 140. Request 620 may include the features of request 610, but may also include information obtained from the evaluation of request 610, such as the user name/password authentication of the called party required by request 610. In the example depicted in FIG. 6, request 620 may include the following parameters: AppID=X; authentication method=password; identifier=MDN; and MDN=16175551111.

Authentication enabler 140 may receive request 620, and may retrieve credentials associated with the called party from identity management database 150, as indicated by reference number 625. Authentication enabler 140 may communicate with authentication client 310, and possibly other devices/networks 160, as indicated by reference number 665. Based on such communication, authentication enabler 140 may perform the user name/password authentication requested by request 620, as indicated by reference number 630. Authentication client 310 may request information 635 from the called party, and the called party may provide information 635. Information 635 may include a user name and password associated with the called party. Authentication client 310 may create a response 640, that includes information 635, and may provide response 640 to authentication enabler 140. Based on response 640, authentication enabler 140 may complete the authentication process by comparing credentials 625 with information 635, may create an authentication token (if the authentication is successful), and may generate a response 645 that includes the authentication token and an expiration value.

Authentication enabler 140 may provide response 645 to gateway 120, and gateway 120 may provide a third party call request 650, which may include the features of call request 610, to a calling enabler provided in other devices/networks 160. Third party call request 650 may include the following parameters: makecall; AppID=X; identifier=MDN; calling party=16175550101; and called party=16175551111. The calling enabler may establish the call between the calling party and the called party, and may return a response 655 (e.g., indicating call completion) to gateway 120. Gateway 120 may log the information provided in responses 645/655 and may generate a response 660. Response 660 may include the features of responses 645/655. Gateway 120 may provide response 660 to application server 130, and application server 130 may enable the calling party, via user device 110, to conduct the call with the called party.

Although FIG. 6 shows example components of network portion 600, in other implementations, network portion 600 may include fewer components, different components, differently arranged components, or additional components than depicted in FIG. 6. Alternatively, or additionally, one or more components of network portion 600 may perform one or more other tasks described as being performed by one or more other components of network portion 600.

FIG. 7 is a diagram of example authentication request operations, where the authentication request is missing an end user identifier, capable of being performed by an example portion 700 of network 100. As shown in FIG. 7, network portion 700 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-6.

For the authentication operations of FIG. 7, it may be assumed that an enabler request, generated by an application of application server 130, does not include an identity of an end user of user device 110. It may further be assumed that the application requests a location of another user device associated with a target user 765, and that target user 765 has authorized the application to retrieve his/her location. However, it may be assumed that policies (e.g., including business rules) require that the end user (or requester) be identified and authenticated.

As further shown in FIG. 7, the end user, via user device 110, may invoke the use of an application provided by application server 130, as indicated by reference number 705. The application may include, for example, an application requesting a location of target user 765. Based on requested use 705 of the application, application server 130 may generate a location request 710 requesting the location of target user 765. In the example depicted in FIG. 7, location request 710 may include the following parameters: AppID=X; AppPwd=Y; and target user MDN=16175550101.

Application server 130 may provide request 710 to gateway 120, and gateway 120 may receive request 710. Gateway 120 may evaluate request 710 by retrieving information provided in identity management database 150, as indicated by reference number 715. For example, gateway 120 may evaluate 715 policies for the application, associated with request 710, to determine what and if authentication is required by request 710. In the example of FIG. 7, it may be assumed that gateway 120 determines that authentication of the end user is required and that user name and password authentication or a higher level of assurance is required for the end user. Gateway 120 may also evaluate 715 request 710 for compliance with the determined authentication requirements. In the example of FIG. 7, it may be assumed that gateway 120 determines that request 710 does not include an identifier associated with the end user. Since the end user identifier is missing in request 710, gateway 120 may not return a location of target user 765, but instead may return a message 720, to application server 130, requesting the end user identifier. Message 720 may include an error message for location request 710. The application of application server 130 may receive message 720, and may re-issue a location request 725 that includes the features of request 710 as well as the missing end user identifier (e.g., MDN=161755501111). Application server 130 may provide location request 725 to gateway 120. In one example implementation, application server 130 may provide an independent response to message 720, which is not a re-issued location request but includes the end user identifier, and gateway 120 may associate the independent response with location request 710.

Based on receipt of request 725, gateway 120 may provide a request 730 to authentication enabler 140. Request 730 may include the features of request 725, but may also include information obtained from the evaluation of request 710, such as the user name/password authentication of the end user required by request 710. In the example depicted in FIG. 7, request 730 may include the following parameters: AppID=X; authentication method=password; identifier=MDN; and MDN=16175551111.

Authentication enabler 140 may receive request 730, and may retrieve credentials associated with the end user from identity management database 150, as indicated by reference number 735. Authentication enabler 140 may communicate with authentication client 310, and possibly other devices/networks 160, as indicated by reference number 780. Based on such communications, authentication enabler 140 may perform the user name/password authentication requested by request 730, as indicated by reference number 740. Authentication client 310 may request information 745 from the end user, and the end user may provide information 745. Information 745 may include a user name and password associated with the end user. Authentication client 310 may create a response 750, that includes information 745, and may provide response 750 to authentication enabler 140. Based on response 750, authentication enabler 140 may complete the authentication process by comparing credentials 735 with information 745, may create an authentication token (if the authentication is successful), and may generate a response 755 that includes the authentication token and an expiration value.

Authentication enabler 140 may provide response 755 to gateway 120, and gateway 120 may provide a location request 760, which may include the features of location request 710, to a location enabler provided in other devices/networks 160. The location enabler may retrieve a location 770 (e.g., of target user 765) from target user 765, and may return location 770 to gateway 120. Gateway 120 may log the information provided in response 755 and location 770, and may generate a response 775. Response 775 may include the features of response 755 as well as location 770. Gateway 120 may provide response 775 to application server 130, and application server 130 may enable the end user, via user device 110, to use location 770 of target user 765.

Although FIG. 7 shows example components of network portion 700, in other implementations, network portion 700 may include fewer components, different components, differently arranged components, or additional components than depicted in FIG. 7. Alternatively, or additionally, one or more components of network portion 700 may perform one or more other tasks described as being performed by one or more other components of network portion 700.

Figure 8:
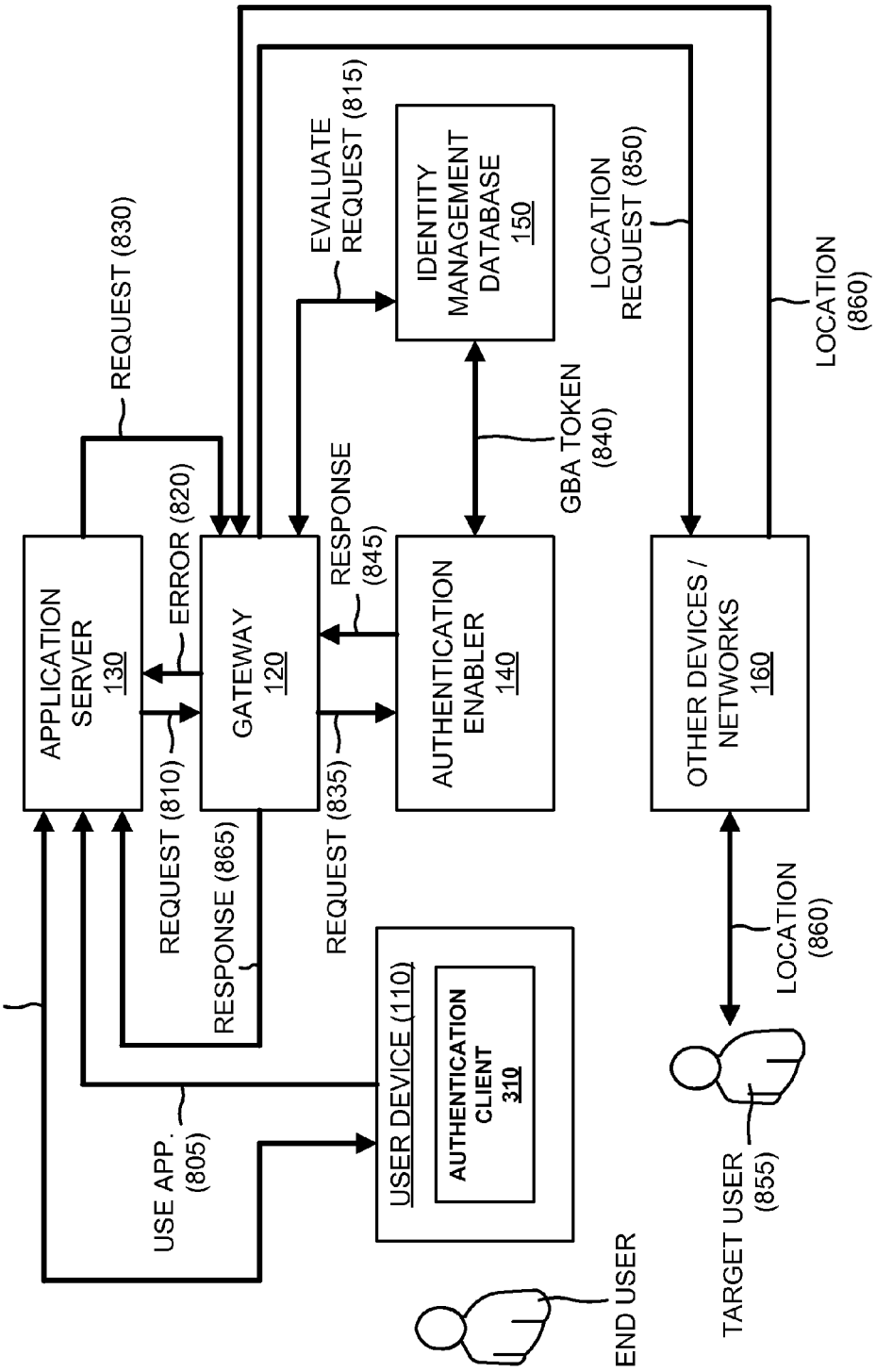
FIG. 8 is a diagram of example location operations capable of being performed by an example portion of the network illustrated in FIG. 1.

FIG. 8 is a diagram of example location operations capable of being performed by an example portion 800 of network 100. As shown in FIG. 8, network portion 800 may include user device 110, gateway 120, application server 130, authentication enabler 140, identity management database 150, other devices/networks 160, and authentication client 310. User device 110, gateway 120, application server 130, authentication enabler 140, identity management database 150, other devices/networks 160, and authentication client 310 may include the features described above in connection with one or more of, for example, FIGS. 1-7.

For the authentication operations of FIG. 8, it may be assumed that an enabler request, generated by an application of application server 130, does not include an identity of an end user of user device 110. It may further be assumed that the application requests a location of another user device associated with a target user 855, and that target user 855 has authorized the application to retrieve his/her location. However, it may be assumed that policies (e.g., including business rules) require that the end user (or requester) be identified and authenticated. It may also be assumed that user device 110 has been authenticated as described below in connection with FIG. 9.

As further shown in FIG. 8, the end user, via user device 110, may invoke the use of an application provided by application server 130, as indicated by reference number 805. The application may include, for example, an application requesting a location of target user 855. Based on requested use 805 of the application, application server 130 may generate a location request 810 requesting the location of target user 855. In the example depicted in FIG. 8, location request 810 may include the following parameters: AppID=X; AppPwd=Y; and target user MDN=16175550101.

Application server 130 may provide request 810 to gateway 120, and gateway 120 may receive request 810. Gateway 120 may evaluate request 810 by retrieving information provided in identity management database 150, as indicated by reference number 815. For example, gateway 120 may evaluate 815 policies for the application, associated with request 810, to determine what and if authentication is required by request 810. In the example of FIG. 8, it may be assumed that gateway 120 determines that authentication of the end user is required and that GBA authentication or a higher level of assurance is required for the end user. Gateway 120 may also evaluate 815 request 810 for compliance with the determined authentication requirements. In the example of FIG. 8, it may be assumed that gateway 120 determines that request 810 does not include an identifier associated with the end user. Since the end user identifier is missing in request 810, gateway 120 may not return a location of target user 855, but instead may return a message 820, to application server 130, requesting the end user identifier. Message 820 may include an error message for location request 810.

The application of application server 130 may receive message 820, and may obtain the end user identifier from user device 110, as indicated by reference number 825. The application of application server 130 may re-issue a location request 830 that includes the features of request 810 as well as the missing end user identifier 825 (e.g., MDN=161755501111). Application server 130 may provide location request 830 to gateway 120. In one example implementation, application server 130 may provide an independent response to message 820, which is not a re-issued location request but includes the end user identifier, and gateway 120 may associate the independent response with location request 810.

Based on receipt of request 830, gateway 120 may provide a request 835 to authentication enabler 140. Request 835 may include the features of request 830, but may also include information obtained from the evaluation of request 810, such as the GBA authentication of the end user required by request 810. In the example depicted in FIG. 8, request 835 may include the following parameters: AppID=X; authentication method=GBA; identifier=MDN; and MDN=16175551111. A GBA authentication may be performed when authentication client 310 is executed by user device 110 and when a GBA session expires. In either case, a successful authentication may result in a GBA token 840 being stored in identity management database 150.

Authentication enabler 140 may receive request 835, and may retrieve GBA token 840, associated with the end user, from identity management database 150. If GBA token 840 is present, authentication enabler 140 may validate GBA token 840 and may return a successful GBA authentication response 845 to gateway 120. Gateway 120 may provide a location request 850, which may include the features of location request 810, to a location enabler provided in other devices/networks 160. The location enabler may retrieve a location 860 (e.g., of target user 855) from target user 855, and may return location 860 to gateway 120. Gateway 120 may log the information provided in response 845 and location 860, and may generate a response 865. Response 865 may include the features of response 845 as well as location 860. Gateway 120 may provide response 865 to application server 130, and application server 130 may enable the end user, via user device 110, to use location 860 of target user 855.

Although FIG. 8 shows example components of network portion 800, in other implementations, network portion 800 may include fewer components, different components, differently arranged components, or additional components than depicted in FIG. 8. Alternatively, or additionally, one or more components of network portion 800 may perform one or more other tasks described as being performed by one or more other components of network portion 800. In one example implementation, the operations depicted in FIGS. 7 and 8 may be used for services other than location-based services, such as sending a short message service (SMS) message, discovering capabilities of a device, establishing a chat session, establishing a video call, sharing a video, etc.

Figure 9:
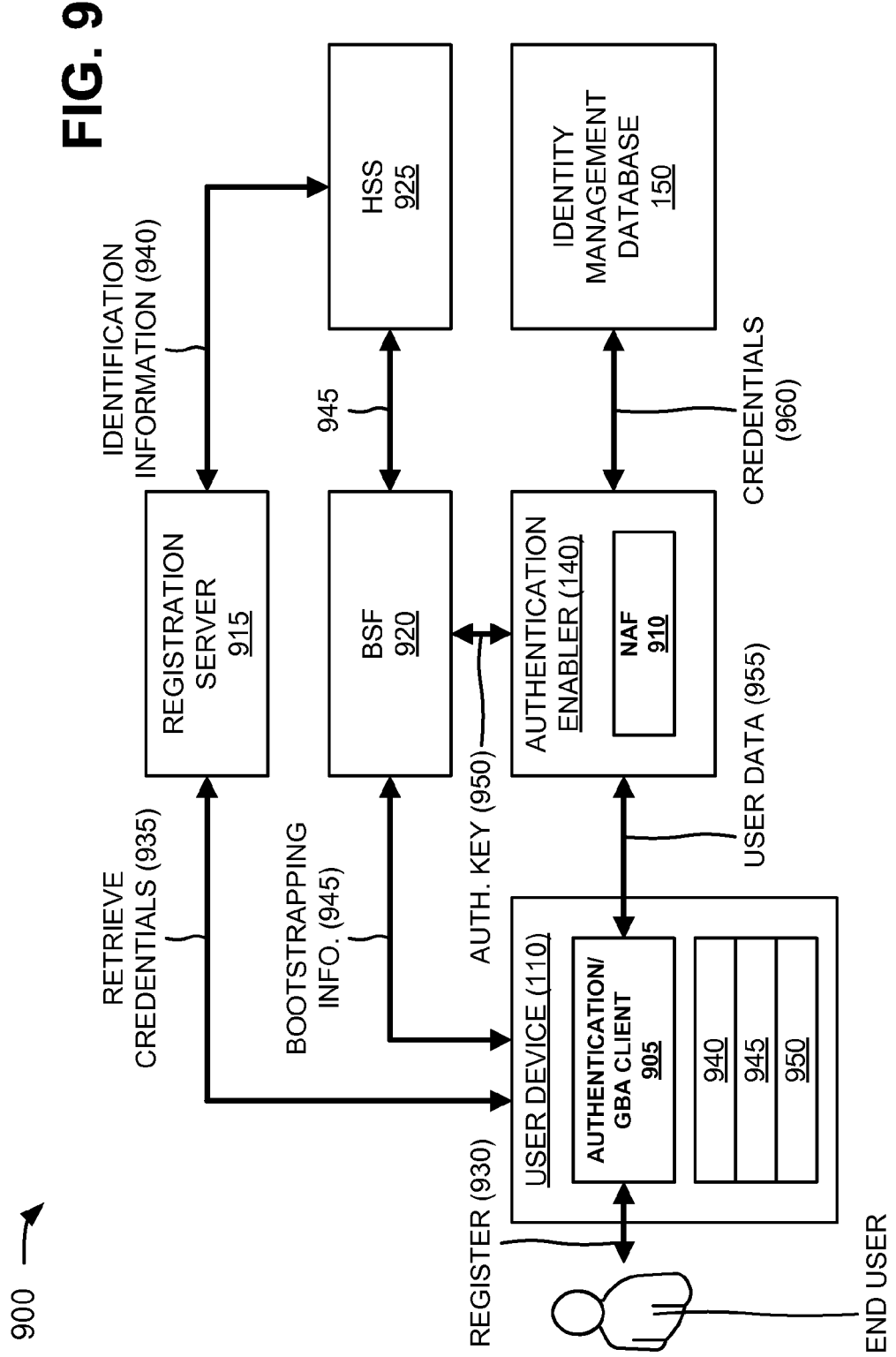
FIG. 9 is a diagram of example authentication operations capable of being performed by an example portion of the network illustrated in FIG. 1.

FIG. 9 is a diagram of example authentication operations capable of being performed by an example portion 900 of network 100. As shown in FIG. 9, network portion 900 may include user device 110, authentication enabler 140, and identity management database 150. User device 110, authentication enabler 140, and identity management database 150 may include the features described above in connection with one or more of, for example, FIGS. 1-7.

As further shown in FIG. 9, to support GBA authentication, user device 110 may include an authentication/GBA client 905, authentication enabler 140 may include a network application function (NAF) 910, and other devices/networks 160 (not shown) may include a registration server 915, a bootstrapping server function 920, and a HSS 925.

Authentication/GBA client 905 may include the features described above in connection with authentication client 310. Authentication/GBA client 905 may also use GBA to generate an authentication specific key shared between authentication/GBA client 905 and authentication enabler 140.

NAF 910 may refer an unknown user device 110 to BSF 920 when the unknown user device 110 is attempting access to a service provided by authentication enabler 140. User device 110 and BSF 920 may agree on a session key to be used for encrypted data exchange with NAF 910. When user device 110 re-connects to BSF 920, NAF 910 may obtain the session key as well as user specific data from BSF 950 and may begin data exchange with user device 110 using the related session keys for encryption.

Registration server 915 may include one or more server devices, or other types of computation or communication devices, that gather, process, search, and/or provide information in a manner described herein. In an example implementation, user device 110, via communications with registration server 915, may create or retrieve a permanent shared key and a private identity.

BSF 920 may include one or more server devices, or other types of computation or communication devices, that gather, process, search, and/or provide information in a manner described herein. In an example implementation, BSF 920 may provide application independent functions for mutual authentication of user device 110 and other devices unknown to each other and for bootstrapping an exchange of secret session keys.

HSS 925 may include one or more server devices, or other types of computation or communication devices, that gather, process, search, and/or provide information in a manner described herein. In an example implementation, HSS 925 may include one or more user databases that support network entities that handle calls. The one or more databases of HSS 925 may include subscription-related information (e.g., user profiles). HSS 925 may perform authentication and authorization of a user, and may provide information about the user's (e.g., user device's 110) profile and subscriptions.

As further shown in FIG. 9, an end user associated with user device 110 may register 930 for services provided by network 100. During registration, the end user may execute authentication/GBA client 905 in order to provide a user name. Credentials for the end user may have been previously created by some other method such as when authentication/GBA client 905 is downloaded to user device 110. The credentials may have been stored in registration server 915. User device 110 may retrieve the stored credentials from registration server 915, as indicated by reference number 935. The retrieved credentials may include a permanent shared key (K) and a private identity, such as an IP Multimedia Private Identity (IMPI). Alternatively, user device 110 may retrieve the credentials from a SIM card or other storage device provided in user device 110. HSS 925 may retrieve identification information 940 from registration server 915. Identification information 940 may include the credentials stored in registration server 915, as well as the user name (e.g., an IP Multimedia Public Identity (IMPU)) provided by the end user. Upon completion of the registration process, authentication/GBA client 905 and HSS 925 may have a user name (IMPU), a private identity (IMPI), and a shared key (K). As further shown in FIG. 9, user device 110 may store identification information 940.

After registration is complete, or when keys expire, authentication/GBA client 905 may begin a bootstrapping process with BSF 920 to retrieve bootstrapping information 945. Bootstrapping information 945 may include the shared key (K) and bootstrapping identification (BTID), which forms an implicit binding between the user name (IMPU) and the private identity (IMPI). As further shown in FIG. 9, bootstrapping information 945 may be shared with or retrieved from HSS 925, and user device 110 may store bootstrapping information 945.

Authentication/GBA client 905 may use GBA processing to generate an authentication key 950 (e.g., K_NAF), and may store authentication key 950 in user device 110. Authentication enabler 140 may retrieve authentication key 950 from BSF 920. After GBA processing, authentication/GBA client 905 may encrypt the user name (IMPU) and any other end user data, and may send such information to authentication enabler, as indicated by reference number 955. Authentication enabler 140 may decrypt user data 955 and may store authentication key 950 and all end user credentials in identity management database 150, as indicated by reference number 960.

Upon completion of the operations depicted in FIG. 9, authentication enabler 140 and identity management database 150 may share end user identifiers and credentials. Authentication enabler 140 may create a token representing a successful GBA authentication for user device 110, which may be associated with the user name (IMPU) and stored in identity management database 150.

Although FIG. 9 shows example components of network portion 900, in other implementations, network portion 900 may include fewer components, different components, differently arranged components, or additional components than depicted in FIG. 9. Alternatively, or additionally, one or more components of network portion 900 may perform one or more other tasks described as being performed by one or more other components of network portion 900.

Figure 10:
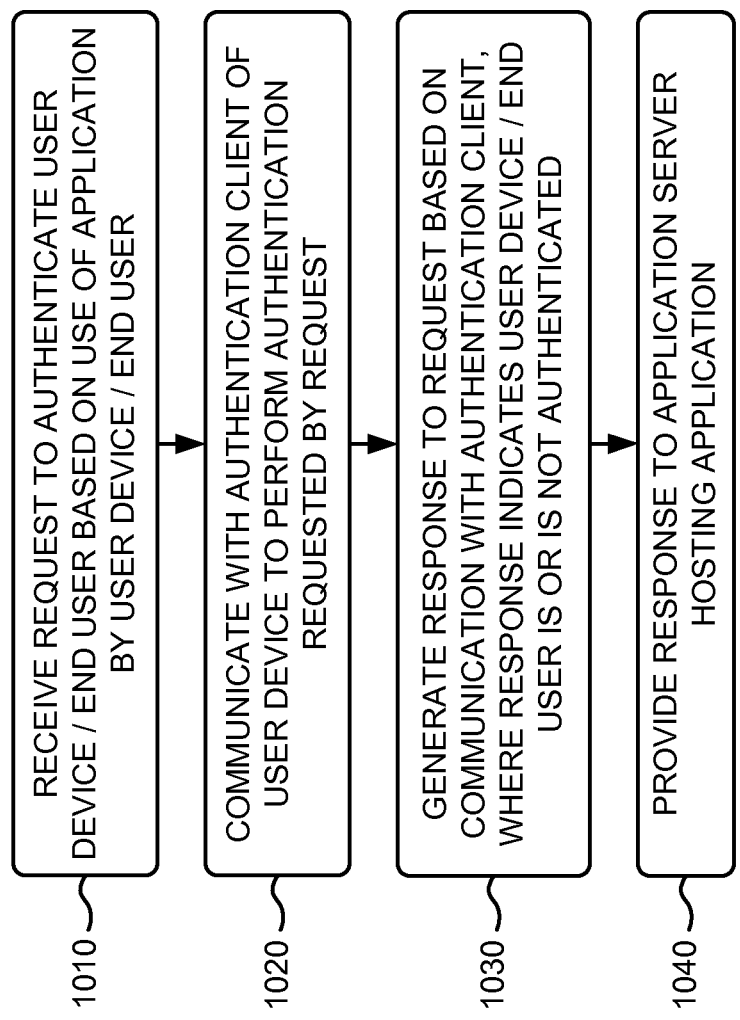
FIG. 10 is a flow chart of an example process for authenticating a user device or an end user according to implementations described herein.

FIG. 10 is a flow chart of an example process 1000 for authenticating a user device or an end user according to implementations described herein. In one implementation, process 1000 may be performed by authentication enabler 140. In another implementation, some or all of process 1000 may be performed by another device or group of devices, including or excluding authentication enabler 140.

As shown in FIG. 10, process 1000 may include receiving a request to authenticate a user device and/or an end user based on use of an application by the user device and the end user (block 1010). For example, in implementations described above in connection with FIG. 4A, an end user, via user device 110, may invoke the use of an application provided by application server 130, as indicated by reference number 405. Based on requested use 405 of the application, application server 130 may generate request 410 to use authentication services provided by authentication enabler 140. Request 410 may include, for example, a request to authenticate the end user of user device 110 using a GBA. In another example, request 410 may include a request to authenticate the end user with a user name and password that may not be known to the application but may be credentials in an account or identity profile associated with the end user. Application server 130 may provide request 410 to gateway 120, and gateway 120 may receive request 410. Gateway 120 may evaluate request 410 by retrieving information provided in identity management database 150, as indicated by reference number 415. Based on the evaluation of request 410, gateway 120 may provide request 420 to authentication enabler 140. Request 420 may include the features of request 410, but may also include information obtained from the evaluation of request 410, such as an authentication required by request 410.

As further shown in FIG. 10, process 1000 may include communicating with an authentication client of the user device to perform an authentication requested by request (block 1020). For example, in implementations described above in connection with FIG. 4A, authentication enabler 140 may receive request 420, and may communicate with authentication client 310, and possibly other devices/networks 160 (not shown), to perform the authentication process requested by request 420, as indicated by reference number 425.

Returning to FIG. 10, process 1000 may include generating a response to the request based on the communication with the authentication client, where the response indicates that the user device/end user is or is not authenticated (block 1030), and providing the response to an application server hosting the application (block 1040). For example, in implementations described above in connection with FIG. 4A, based on performance of authentication process 425, authentication enabler 140 may generate response 430. Response 430 may include an expiration value, and details of authentication process 425, such as whether or not the end user is authenticated. Authentication enabler 140 may provide response 430 to gateway 120, and gateway 120 may perform additional processing on response 430 (if necessary) to generate a response 435. Response 435 may include the features of response 430, but may also include information obtained from the additional processing of response 430. Gateway 120 may provide response 435 to application server 130, and application server 130 may determine whether the end user is authenticated for the application based on response 435.

Figure 11:
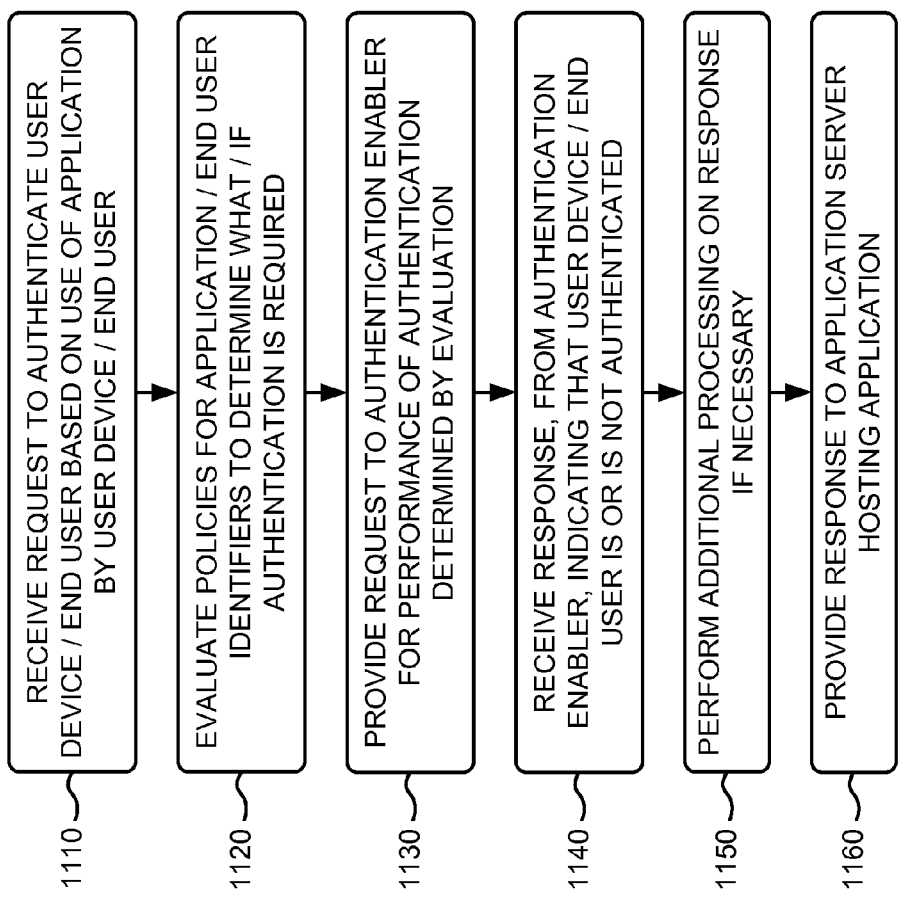
FIG. 11 is a flow chart of another example process for authenticating a user device or an end user according to implementations described herein.

FIG. 11 is a flow chart of another example process 1100 for authenticating a user device or an end user according to implementations described herein. In one implementation, process 1100 may be performed by gateway 120. In another implementation, some or all of process 1100 may be performed by another device or group of devices, including or excluding gateway 120.

As shown in FIG. 11, process 1100 may include receiving a request to authenticate a user device and/or an end user based on use of an application by the user device and the end user (block 1110), and evaluating policies for application and end user identifiers to determine what and if authentication is required (block 1120). For example, in implementations described above in connection with FIG. 4A, an end user, via user device 110, may invoke the use of an application provided by application server 130, as indicated by reference number 405. Based on requested use 405 of the application, application server 130 may generate request 410 to use authentication services provided by authentication enabler 140. Application server 130 may provide request 410 to gateway 120, and gateway 120 may receive request 410. Gateway 120 may evaluate request 410 by retrieving information provided in identity management database 150, as indicated by reference number 415. For example, gateway 120 may evaluate 415 policies for the application, associated with request 410, to determine what and if authentication is required by request 410. Gateway 120 may also evaluate 415 policies for the end user identifier (e.g., the MDN), provided in request 410, to determine what and if authentication is required.

As further shown in FIG. 11, process 1100 may include providing the request to an authentication enabler for performance of the authentication determined by the evaluation (block 1130), and receiving a response, from the authentication enabler, indicating that the user device/end user is or is not authenticated (block 1140). For example, in implementations described above in connection with FIG. 4A, based on the evaluation of request 410, gateway 120 may provide request 420 to authentication enabler 140. Request 420 may include the features of request 410, but may also include information obtained from the evaluation of request 410, such as an authentication required by request 410. Authentication enabler 140 may receive request 420, and may communicate with authentication client 310, and possibly other devices/networks 160 (not shown), to perform the authentication process requested by request 420, as indicated by reference number 425. Based on performance of authentication process 425, authentication enabler 140 may generate response 430. Response 430 may include an expiration value, and details of authentication process 425, such as whether or not the end user is authenticated. Authentication enabler 140 may provide response 430 to gateway 120.

Returning to FIG. 11, process 1100 may include performing additional processing on the response if necessary (block 1150), and providing the response to an application server hosting the application (block 1160). For example, in implementations described above in connection with FIG. 4A, gateway 120 may perform additional processing on response 430 (if necessary) to generate response 435. Response 435 may include the features of response 430, but may also include information obtained from the additional processing of response 430. Gateway 120 may provide response 435 to application server 130, and application server 130 may determine whether the end user is authenticated for the application based on response 435. For example, if response 435 indicates that the end user is authenticated, application server 130 may permit the end user, via user device 110, to use the application. If response 435 indicates that the end user is not authenticated, application server 130 may not permit the end user to use the application.

FIG. 12 is a flow chart of an example process 1200 for performing policy-based authentication according to implementations described herein. In one implementation, process 1200 may be performed by gateway 120. In another implementation, some or all of process 1200 may be performed by another device or group of devices, including or excluding gateway 120.

As shown in FIG. 12, process 1200 may include receiving a request, with application and end user identifiers, to authenticate an application and/or an end user associated with the identifiers (block 1210), and evaluating policies for the application and end user identifiers to determine what and if authentication is required (block 1220). For example, in implementations described above in connection with FIG. 4B, the end user, via user device 110, may use 405 an application provided by application server 130. Based on requested use 405 of the application, application server 130 may generate request 445 that includes an application identifier and an identifier for the end user, such as the MDN for user device 110. In one example, request 445 may include the features described above for request 410. Application server 130 may provide request 445 to gateway 120, and gateway 120 may receive request 445. Gateway 120 may evaluate request 445 by retrieving information provided in identity management database 150, as indicated by reference number 450. For example, gateway 120 may evaluate 450 policies for the application, associated with request 445, to determine what and if authentication is required by request 445. Gateway 120 may also evaluate 450 policies for the end user identifier (e.g., the MDN), provided in request 445, to determine what and if authentication is required.

As further shown in FIG. 12, process 1200 may include retrieving, when authentication is required, authentication requirements and a token associated with the application and end user identifiers (block 1230), and determining whether a valid token is present (block 1240). For example, in implementations described above in connection with FIG. 4B, if authentication is required by request 445, gateway 120 may retrieve authentication requirements and a token (if present) associated with the application identifier and/or the end user identifier. Gateway 120 may then determine whether a valid token is present for the application and/or end user identifiers. If a token is present, gateway 120 may validate the token when the token meets authentication requirements and has not expired. For example, an authentication requirement may include GBA authentication with user name and password authentication.

Returning to FIG. 12, if the token is present and valid (block 1240—VALID TOKEN), process 1200 may include performing additional processing on the request (block 1250), and providing, to an application server hosting the application, a response indicating that the application/end user is or is not authenticated (block 1260). For example, in implementations described above in connection with FIG. 4B, if the token is valid, gateway 120 may log authentication session information in response 452. The authentication session information may include the validated token, results of the additional policy evaluations, and results of additional actions performed by gateway 120, etc. Gateway 120 may provide response 452 to application server 130, and application server 130 may determine that the end user is authenticated for the application based on response 452 and may permit the end user, via user device 110, to use the application.

As further shown in FIG. 12, if the token is not present or is not valid (block 1240—NO VALID TOKEN), process 1200 may include providing a request to an authentication enabler for performance of the authentication (block 1270), receiving, from the authentication enabler, a response indicating that the application/end user is or is not authenticated (block 1280), and creating a token and expiration value (if the authentication is successful) and providing the response to the application server (block 1290). For example, in implementations described above in connection with FIG. 4B, if the token has expired or is determined to be invalid based on the evaluation of request 445, gateway 120 may provide request 455 to authentication enabler 140. Request 455 may include the features of request 445, but may also include information obtained from the evaluation of request 445, such as an authentication required by request 445. Authentication enabler 140 may receive request 455, and may communicate with authentication client 310, and possibly other devices/networks 160 (not shown), to perform the authentication process requested by request 455, as indicated by reference number 460. Based on performance of authentication process 460, authentication enabler 140 may generate a response 465. Response 465 may include an authentication token (if the authentication is successful) and an expiration value. Authentication enabler 140 may provide response 465 to gateway 120, and gateway 120 may provide response 470 to application server 130. Application server 130 may determine whether the end user is authenticated for the application based on response 470.

FIG. 13 is a flow chart of an example process 1300 for authenticating a user device or an end user, when an authentication request is missing an end user identifier, according to implementations described herein. In one implementation, process 1300 may be performed by authentication enabler 140. In another implementation, some or all of process 1300 may be performed by another device or group of devices, including or excluding authentication enabler 140.

As shown in FIG. 13, process 1300 may include receiving a request for a location of a target user and authentication of the requester (block 1310), receiving, from a database, credentials associated with the requester (block 1320), and communicating with an authentication client, provided in a user device of the requester, to retrieve identification information of the requester (block 1330). For example, in implementations described above in connection with FIG. 7, the end user, via user device 110, may invoke the use of an application provided by application server 130, as indicated by reference number 705. The application may include, for example, an application requesting a location of target user 765. Based on requested use 705 of the application, application server 130 may generate location request 710 requesting the location of target user 765. Application server 130 may provide request 710 to gateway 120, and gateway 120 may receive request 710. It may be assumed that gateway 120 determines that request 710 does not include an identifier associated with the end user. Since the end user identifier is missing in request 710, gateway 120 may not return a location of target user 765, but instead may return a message 720, to application server 130, requesting the end user identifier. The application of application server 130 may receive message 720, and may re-issue a location request 725 that includes the features of request 710 as well as the missing end user identifier (e.g., MDN=161755501111). Application server 130 may provide location request 725 to gateway 120. Based on receipt of request 725, gateway 120 may provide request 730 to authentication enabler 140. Authentication enabler 140 may receive request 730, and may retrieve credentials associated with the end user from identity management database 150, as indicated by reference number 735. Authentication enabler 140 may communicate with authentication client 310, and possibly other devices/networks 160, as indicated by reference number 780, to perform the user name/password authentication requested by request 730, as indicated by reference number 740.

As further shown in FIG. 13, process 1300 may include receiving, from the authentication client, identification information of the requester (block 1340), and determining, based on the credentials and the identification information, whether the requester is authenticated to receive the location of the target user (block 1350). For example, in implementations described above in connection with FIG. 7, authentication client 310 may request information 745 from the end user, and the end user may provide information 745. Information 745 may include a user name and password associated with the end user. Authentication client 310 may create a response 750, that includes information 745, and may provide response 750 to authentication enabler 140. Based on response 750, authentication enabler 140 may complete the authentication process by comparing credentials 735 with information 745, and may create an authentication token (if the authentication is successful).

Returning to FIG. 13, process 1300 may include generating, based on the determination, a response indicating that the requester is or is not authenticated (block 1360), and providing the response to a gateway device responding to the location request based on the response (block 1370). For example, in implementations described above in connection with FIG. 7, based on response 750, authentication enabler 140 may generate response 755 that includes the authentication token and an expiration value. Authentication enabler 140 may provide response 755 to gateway 120, and gateway 120 may provide location request 760, which may include the features of location request 710, to a location enabler provided in other devices/networks 160. The location enabler may retrieve a location 770 (e.g., of target user 765) from target user 765, and may return location 770 to gateway 120. Gateway 120 may log the information provided in response 755 and location 770, and may generate a response 775. Response 775 may include the features of response 755 as well as location 770. Gateway 120 may provide response 775 to application server 130, and application server 130 may enable the end user, via user device 110, to use location 770 of target user 765.

FIG. 14 is a flow chart of an example process 1400 for locating a target user according to implementations described herein. In one implementation, process 1400 may be performed by authentication enabler 140. In another implementation, some or all of process 1400 may be performed by another device or group of devices, including or excluding authentication enabler 140.

As shown in FIG. 14, process 1400 may include authenticating a user device associated with a requester (block 1410), and receiving a request for a location of a target user and for authentication of the requester (block 1420). For example, in implementations described above in connection with FIG. 8, it may be assumed that user device 110 has been authenticated. An end user, via user device 110, may invoke the use of an application provided by application server 130, as indicated by reference number 805. The application may include, for example, an application requesting a location of target user 855. The application of application server 130 may re-issue location request 830 that includes the features of request 810 as well as the missing end user identifier 825 (e.g., MDN=161755501111). Application server 130 may provide location request 830 to gateway 120. Based on receipt of request 830, gateway 120 may provide request 835 to authentication enabler 140. Request 835 may include the features of request 830, but may also include information obtained from the evaluation of request 810, such as the GBA authentication of the end user required by request 810. Authentication enabler 140 may receive request 835.

As further shown in FIG. 14, process 1400 may include determining whether a token associated with the requester is present in a database (block 1430). If the token is not present in the database (block 1430—NO TOKEN), process 1400 may end. For example, in implementations described above in connection with FIG. 8, authentication enabler 140 may retrieve GBA token 840, associated with the end user, from identity management database 150. If GBA token 840 is not present in identity management database 150, authentication enabler 140 may not authenticate the end user.

Returning to FIG. 14, if the token is present in the database (block 1430—TOKEN), process 1400 may include validating the token and generating a successful authentication response (block 1440), and providing the successful authentication response to a gateway device, where the gateway device responds to the location request with the location of the target user (block 1450). For example, in implementations described above in connection with FIG. 8, if GBA token 840 is present, authentication enabler 140 may validate GBA token 840 and may return a successful GBA authentication response 845 to gateway 120. Gateway 120 may provide location request 850, which may include the features of location request 810, to a location enabler provided in other devices/networks 160. The location enabler may retrieve location 860 (e.g., of target user 855) from target user 855, and may return location 860 to gateway 120. Gateway 120 may log the information provided in response 845 and location 860, and may generate a response 865. Response 865 may include the features of response 845 as well as location 860. Gateway 120 may provide response 865 to application server 130, and application server 130 may enable the end user, via user device 110, to use location 860 of target user 855.

FIG. 15 is a flow chart of another example process 1500 for locating a target user according to implementations described herein. In one implementation, process 1500 may be performed by gateway 120. In another implementation, some or all of process 1500 may be performed by another device or group of devices, including or excluding gateway 120.

As shown in FIG. 15, process 1500 may include receiving, from an application used by a user device, a request for a location of a target user (block 1510), determining that the request does not include an identifier of the end user of the user device (block 1520), and providing, to the application, an error message indicating the missing identifier of the end user (block 1530). For example, in implementations described above in connection with FIG. 8, the end user, via user device 110, may invoke the use of an application provided by application server 130, as indicated by reference number 805. Based on requested use 805 of the application, application server 130 may generate location request 810 requesting the location of target user 855. Application server 130 may provide request 810 to gateway 120, and gateway 120 may receive request 810. Gateway 120 may evaluate request 810 by retrieving information provided in identity management database 150, as indicated by reference number 815. It may be assumed that gateway 120 determines that authentication of the end user is required and that GBA authentication or a higher level of assurance is required for the end user. It may also be assumed that gateway 120 determines that request 810 does not include an identifier associated with the end user. Since the end user identifier is missing in request 810, gateway 120 may not return a location of target user 855, but instead may return message 820, to application server 130, requesting the end user identifier. Message 820 may include an error message for location request 810.

As further shown in FIG. 15, process 1500 may include receiving, based on the error message and from the application, a request and the identifier of the end user (block 1540), providing the request to an authentication enabler for authenticating the end user based on the identifier (block 1550), and receiving a valid authentication response from the authentication enabler based on the request (block 1560). For example, in implementations described above in connection with FIG. 8, the application of application server 130 may receive message 820, and may obtain the end user identifier from user device 110, as indicated by reference number 825. The application of application server 130 may re-issue location request 830 that includes the features of request 810 as well as the missing end user identifier 825 (e.g., MDN=161755501111). Application server 130 may provide location request 830 to gateway 120. Based on receipt of request 830, gateway 120 may provide a request 835 to authentication enabler 140. Request 835 may include the features of request 830, but may also include information obtained from the evaluation of request 810, such as the GBA authentication of the end user required by request 810. Authentication enabler 140 may receive request 835, and may retrieve GBA token 840, associated with the end user, from identity management database 150. If GBA token 840 is present, authentication enabler 140 may validate GBA token 840 and may return a successful GBA authentication response 845 to gateway 120.

Returning to FIG. 15, process 1500 may include sending the location request to a location determining device (block 1570), receiving a location of the target user from the location determining device (block 1580), and sending the location of the target user to the application (block 1590). For example, in implementations described above in connection with FIG. 8, gateway 120 may provide location request 850, which may include the features of location request 810, to a location enabler provided in other devices/networks 160. The location enabler may retrieve location 860 (e.g., of target user 855) from target user 855, and may return location 860 to gateway 120. Gateway 120 may log the information provided in response 845 and location 860, and may generate a response 865. Response 865 may include the features of response 845 as well as location 860. Gateway 120 may provide response 865 to application server 130, and application server 130 may enable the end user, via user device 110, to use location 860 of target user 855.

Systems and/or methods described herein may provide an authentication enabler and a gateway in a service provider network, and may provide an authentication client in a user device. The authentication enabler, gateway, and authentication client may enable the systems and/or methods to perform authentication processes. For example, the systems and/or methods may perform an authentication as a result of an authentication request received from a third party application. In another example, the systems and/or methods may perform a policy-based authentication in which the gateway performs a role in evaluating authentication policies.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, a request to authenticate an end user of a user device based on a requested use of an application by the user device, wherein the request is received from an application server device that hosts the application, wherein the request includes an application identifier for the application and an end user identifier for the end user;
   evaluating, by the computing device, policies for the end user identifier to determine what type of authentication is required for the end user identifier;
   evaluating, by the computing device, policies for the application identifier to determine what type of authentication is required for the application identifier;
   providing, by the computing device, an authentication request to an authentication enabler device, wherein the authentication request includes an authentication context specifying a required type of authentication determined based on the evaluations;
   forwarding, by the computing device, the request to another enabler device requested by the request;
   receiving, by the computing device and from the other enabler device, results of performance of functions performed by the other enabler device;
   receiving, by the computing device and from the authentication enabler device, a response indicating that the end user is or is not authenticated to use the application; and
   providing, by the computing device, the response to the application server device hosting the application.

2. The method of claim 1, wherein the request includes at least one of:
   a request to authenticate the end user of the user device using a generic bootstrapping architecture (GBA),
   a request to authenticate the end user with a user name and password that are not known by the application, or a request that includes a type of authentication and a level of authentication assurance.

3. A method implemented by a computing device, the method comprising:
receiving, by the computing device, a request to authenticate an end user of a user device based on a requested use of an application by the user device, wherein the request is received from an application server device that hosts the application, and wherein the request includes an application identifier and an end user identifier;
evaluating, by the computing device, policies for the end user identifier to determine what type of authentication is required for the end user identifier;
evaluating, by the computing device, policies for the application identifier to determine what type of authentication is required for the application identifier;
retrieving, by the computing a token associated with the application and end user identifiers;
determining, by the computing device, whether the token is present and valid;
providing, by the computing device and to the application server device hosting the application, when the token is present and valid, a response indicating that the end user is or is not authenticated to use the application;
providing, by the computing device and when the token is not present or is invalid, an authentication request to an authentication enabler device, wherein the authentication request includes an authentication context specifying a required type of authentication determined based on the evaluations;
receiving, by the computing device and from the authentication enabler device, a response indicating whether the end user is authenticated to use the application; and
providing, by the computing device, the response to the application server device.

4. The method of claim 3, further comprising:
receiving an authentication query from the application server device, wherein the authentication query requests an authentication state associated with the application and the end user identifier;
evaluating the authentication query to determine compliance with governing policies for the application and the end user identifier;
generating, based on the evaluation, an authentication response that includes the authentication state associated with the application and the end user identifier; and
providing the authentication response to the application server device.

5. The method of claim 3, where the request includes a request to authenticate the end user with one of:
a generic bootstrapping architecture (GBA),
a user name and password that are not known by the application,
a password,
a one-time password,
a public key cryptography, or
biometrics.

6. A method implemented by a computing device, the method comprising:
receiving, by the computing device and from an application server device hosting an application being used by a user device, a request for a service provided by the application for the user device, wherein the request includes an application identifier;
determining, by the computing device, that the request does not include an identifier of the end user;
providing, by the computing device and to the application server device, an error message indicating that the identifier of the end user is missing;
receiving, by the computing device and from the application server device, based on the error message, the identifier of the end user and a request for authenticating the end user;
evaluating, by the computing device, policies for the identifier of the end user to determine what type of authentication is required for the identifier of the end user;
evaluating, by the computing device, policies for the application identifier to determine what type of authentication is required for the application identifier;
providing, by the computing device, an authentication request to an authentication enabler, wherein the authentication request includes an authentication context specifying a required type of authentication determined based on the evaluations, wherein the authentication enabler:
receives the request for authenticating the end user,
determines whether a token associated with the end user is present in a database, validates the token when the token is present in the database,
generates the valid authentication response when the token is present in the database, and
provides the valid authentication response to the computing device; and
receiving, by the computing device and based on the authentication request, a valid authentication response from the authentication enabler.

7. The method of claim 6, further comprising:
sending, after receiving the valid authentication response, the service request to a service providing device;
receiving a particular service from the service providing device; and
providing the particular service to the application server device.

8. The method of claim 6, where the service includes determining a location of a target user.

9. The method of claim 1, wherein the type of authentication required for the end user identifier includes:
a user name and password that are not known by the application,
a password,
a one-time password,
a public key cryptography, or
biometrics.

10. The method of claim 1, where the request includes a level of authentication assurance.

11. The method of claim 1, wherein receiving, from the other enabler device, results of performance of functions performed by the other enabler device includes:
receiving information identifying the location of the user device.

12. The method of claim 1, wherein the type of authentication required for the end user identifier includes a two-factor authentication.

13. The method of claim 1, wherein the authentication context includes an Extensible Markup Language (XML) schema.

14. The method of claim 13, wherein the XML schema includes at least one of:
a user identification mechanism;
a mechanism to minimize compromising of credentials;
a mechanism for storing and protecting credentials; or
an authentication mechanism.

15. The method of claim 6, wherein the type of authentication required for the identifier for the end user includes:
- a user name and password that are not known by the application,
- a password,
- a one-time password,
- a public key cryptography, or
- biometrics.

16. The method of claim 6, where the request includes a level of authentication assurance.

17. The method of claim 6, wherein the type of authentication required for the end user identifier includes a two-factor authentication.

18. The method of claim 6, wherein the authentication context includes an Extensible Markup Language (XML) schema.

19. The method of claim 18, wherein the XML schema includes at least one of:
- a user identification mechanism;
- a mechanism to minimize compromising of credentials;
- a mechanism for storing and protecting credentials; or
- an authentication mechanism.

\* \* \* \* \*